United States Patent [19]
Papworth et al.

[11] Patent Number: 5,778,245
[45] Date of Patent: Jul. 7, 1998

[54] METHOD AND APPARATUS FOR DYNAMIC ALLOCATION OF MULTIPLE BUFFERS IN A PROCESSOR

[75] Inventors: David B. Papworth, Beaverton; Andrew F. Glew, Hillsboro; Glenn J. Hinton; Robert P. Colwell, both of Portland; Michael A. Fetterman, Hillsboro; Shantanu R. Gupta, Beaverton; James S. Griffith, Aloha, all of Oreg.

[73] Assignee: Intel Corporation, Santa Clara, Calif.

[21] Appl. No.: 204,861

[22] Filed: Mar. 1, 1994

[51] Int. Cl.$^6$ ............................................. G06F 15/82
[52] U.S. Cl. ................... 395/800.23; 395/391; 395/393; 395/394
[58] Field of Search ................... 395/800, 375, 395/800.23, 800.24, 388, 394, 391, 392, 393, 563, 382

[56] References Cited

U.S. PATENT DOCUMENTS

| 5,511,172 | 4/1996 | Kimura et al. | 395/575 |
| 5,519,864 | 5/1996 | Murtell et al. | 395/650 |
| 5,524,263 | 6/1996 | Griffith et al. | 395/800 |

OTHER PUBLICATIONS

Val Popescu, et al. entitled, "The Metaflow Architecture," IEEE Micro, Jun. 1991, pp. 10–13, 63–73.
Author, Mike Johnson, entitled Superscalar Microprocessor Design, Advance Micro Devices, Prentice Hall Series in Innovative Technolgoy, 1991, pp. 1–289.

Primary Examiner—Larry D. Donaghue
Attorney, Agent, or Firm—Blakely, Sokoloff, Taylor & Zafman

[57] ABSTRACT

A method and apparatus for dynamically allocating entries of microprocessor resources to particular instructions in an efficient manner to efficiently utilize buffer size and resources. The pipelined and superscalar microprocessor is capable of speculatively executing instructions and also out-of-order processing. Resources within the microprocessor include a store buffer, a load buffer, a reorder buffer and a reservation station. The reorder buffer contains a larger set of physical registers and also contains information related to speculative instructions and the reservation station comprises information related to instructions pending execution. The load buffer is only allocated to load instructions and is valid for an instruction from allocation pipestage to instruction retirement. The store buffer is only allocated to store instructions and is valid for an instruction from allocation to store performance. The reservation station is allocated to most instructions and is valid for an instruction from allocation to instruction dispatch. The reorder buffer is allocated to all instructions and is valid for a given instruction from allocation to retirement. The load buffer, store buffer, and reorder buffer are sequentially allocated while the reservation station is not. Resource allocation is performed dynamically (as needed by the operation) rather than as a full set of resources attached to each operation. Using the above allocation scheme, efficient usage of the microprocessor resources is accomplished.

22 Claims, 26 Drawing Sheets

5,778,245

1

METHOD AND APPARATUS FOR DYNAMIC ALLOCATION OF MULTIPLE BUFFERS IN A PROCESSOR

FIELD OF THE INVENTION

The present invention relates to the field of computer systems; more particularly, the present invention relates to allocating buffer resources to instructions processed by a processor.

BACKGROUND OF THE INVENTION

Superscalar microprocessor are capable of processing multiple instructions within a common clock cycle. Pipelined microprocessors divide the processing (from dispatch to retirement) of an operation into separate pipe stages and overlap the pipestage processing of subsequent instructions in an attempt to achieve single pipestage throughput performance. Both pipelined and superscalar microprocessors are well known. Speculative execution of instructions by a microprocessor involves the microprocessor making a branch prediction of a particular program pathway given a particular branch condition. By predicting a given branch pathway, the front end of the microprocessor may process instructions while keeping the pipeline full of information before the actual branch is resolved. Provided the prediction was accurate, the microprocessor receives a large performance gain by maintaining the pipeline full of information before the branch is resolved. However, until it is known that the correct program path was taken, the information processed by the microprocessor from the branch point forward is called "speculative" information. If the checking logic of the microprocessor determines that the microprocessor mispredicted, the speculative information must be purged and the pipeline restarted at the correct program pathway.

Out-of-order processing within a microprocessor involves allowing instructions to be processed out of their program order to gain performance and increase parallelism and efficient resource usage. True data dependent instructions are not executed out-of-order, but often many instructions within a program order do not directly depend on the results of earlier instructions. These instruction may be executed (or processed) out-of-order if the microprocessor contains sufficient resources that can be used in such an efficient manner. Obviously, some instructions may not be executed out-of-order. For instance, a load from a given address must not be executed out-of-order and before an earlier store that writes to that same address. However, for other instructions that are not necessarily data or otherwise dependent, out-of-order execution allows a large performance gain over an in-order microprocessor. For a detailed explanation of speculative out-of-order execution, see M. Johnson, *Superscalar Microprocessor Design*, Prentice Hall, 1991. Speculative and out-of-order execution offer advantages over the prior art, including better use of resources. If multiple instructions are permitted to be executed at the same time (superscalar), this performance benefit greatly increases.

A microprocessor that is pipelined, superscalar, allows speculative execution and further allows out-of-order processing, creates a great demand on its internal resources. For that matter, any advanced microprocessor places a high demand on its internal resources. Therefore, it is advantageous to utilize the internal resources of the microprocessor as efficiently as possible. To this extent, it is advantageous to avoid allocating certain resources for certain instructions if those instructions do not require the resources. Further, it is advantageous to free up resources as soon as possible after

2 they are no longer required by the instructions that use them and also it is advantageous to assign resources to instructions that need them only at the earliest possible moment of need. The present invention provides the above advantages.

Advanced microprocessors, as described above, utilize a number of specialized buffers as resources to perform a number of different tasks and operations. Load and store buffers are well known resources used by microprocessors. A reservation buffer resource may be used as a holding buffer for instructions that have been decoded and are awaiting their source data to become available so they can be executed. A reorder buffer is used to buffer results of speculative execution and provide a larger set of registers for register renaming.

In prior art microprocessors, that may use all or a portion of the resources listed above, instructions are allocated to these resources in an inefficient manner. In prior art microprocessors, entries of a given buffer resource are typically allocated to all instructions through the entire pipeline of these instructions, often irrespective if these instructions actually require use of the given buffer resource. It is advantageous, therefore, to allocate instructions to the above resources in an efficient manner. The present invention provides such capability. Further, throughout the pipeline stages of instruction, different resources are needed and others are not. It is advantageous to consider the pipestage of a given instruction when determining resource allocation for that instruction. The present invention provides such advantageous consideration.

Accordingly, it is an object of the present invention to increase resource use efficiency within an advanced microprocessor. It is further an object of the present invention to consider the pipestage of a given instruction when determining resource allocation for that instruction. It is further an object of the present invention to allocate buffer resources only to instructions that require those resources. It is an object of the present invention to efficiently allocation a load buffer, a store buffer, a reorder buffer and a reservation station to instructions processed by a microprocessor. It is further an object of the present invention to advantageously allocate instructions to these resources at different pipestages of the pipelines of these instructions. It is further an object of the present invention to provide different allocation schemes to different resources in order to increase efficient use of the resource buffers. It is also an object of the present invention to allocate and deallocate instructions from the above resources in an efficient manner. These and other objects not specifically mentioned above will become clear in view of the discussions of the present invention to follow.

SUMMARY OF THE INVENTION

A method and apparatus for dynamically allocating entries of microprocessor resources to particular instructions in an efficient manner. The pipelined and superscalar microprocessor is capable of speculatively executing instructions and also out-of-order processing. Resources within the microprocessor include a store buffer, a load buffer, a reorder buffer and a reservation station. The reorder buffer contains a larger set of physical registers and also contains information related to speculative instructions and the reservation station comprises information related to instructions pending execution. The load buffer is only allocated to load instructions and is valid for an instruction from allocation pipestage to instruction retirement. The store buffer is only allocated to store instructions and is valid for an instruction from allocation to store performance. The reservation station is allocated to most instructions and is valid for an instruction from allocation to instruction dispatch. The reorder buffer is allocated to all instructions and is valid for a given instruction from allocation to retirement. The load buffer, store buffer, and reorder buffer are sequentially allocated while the reservation station is not. Resource allocation is performed dynamically (as needed by the operation) rather than as a full set of resources attached to each operation. Using the above allocation scheme, efficient usage of the microprocessor resources is accomplished.

Specifically, embodiments of the present invention include, in a pipelined processor for coupling to an external bus, the processor having an allocation pipestage wherein resources are allocated to instructions, a dispatch pipestage wherein instruction information is sent for execution, and a retirement pipestage wherein instruction information updates architecturally visible buffers, a mechanism for allocating resources of the processor, the mechanism including: a reorder buffer for containing operand information associated with speculative instructions and for providing a set of physical registers, wherein entries of the reorder buffer are valid from allocation to retirement; a reservation station coupled to the reorder buffer, the reservation station for containing information associated with instructions pending execution, wherein entries of the reservation station are valid from allocation to dispatch; a load buffer for containing information associated with load instructions, wherein entries of the load buffer are valid from allocation to retirement; and a store buffer for containing information associated with store instructions to be performed, wherein entries of the store buffer are valid from allocation to a period when store instructions are performed over the external bus.

Embodiments of the present invention include the above and further comprising an allocator, coupled to the reorder buffer, the reservation station, the load buffer, and the store buffer, the allocator for allocating entries of the reorder buffer, the reservation station, the load buffer and the store buffer and wherein the allocator sequentially allocates the entries of the reorder buffer, the load buffer and the store buffer. Embodiments of the present invention include the above and wherein the allocator is for allocating the reorder buffer to all instructions, the reservation station to most instructions, the load buffer to load instructions and the store buffer to store instructions. Embodiments of the present invention include the above and wherein the allocator non-sequentially allocates the entries of the reservation station.

The present invention includes a processor implemented with the above mechanism and a computer system implemented with the above processor. The present invention also includes a method implemented in accordance with the above.

BRIEF DESCRIPTION OF THE DRAWINGS

FIG. 19B illustrates an example of the efficient instruction scheduling achieved by the present invention

DETAILED DESCRIPTION OF THE PRESENT INVENTION

The present invention includes an apparatus and method for dynamically allocating resources (to instructions and/or operations) including a load buffer, a store buffer, a reorder buffer and a reservation station. In the following detailed description of the present invention numerous specific details are set forth, such as specific number of bits, address sizes, buffer sizes, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring aspects of the present invention.

PART I—GENERAL OVERVIEW AND BUFFER ALLOCATION

The present invention includes an allocation scheme for allocating resources of a processor to instructions processed by that processor. The present invention operates within environment of a superscalar, pipelined microprocessor that speculatively executes instructions and further allows for out-of-order instruction execution. However, other microprocessors may be utilized consistent with the present invention. This processor will be explained within following discussions. In order to allow the processor to perform the above functions, a number of resources are required.

For different types of instructions, the present invention allocates between: 1) a reorder buffer (ROB); 2) a reservation station (RS); 3) a store buffer; and 4) a load buffer. The structure and function of each of the above four buffer resources will be explained in further detail below with each buffer given its own discussion. However, what follows immediately is the procedure utilized by the present invention to assign instructions to these buffers and the lifetime of these assignments (allocations) in relation to an exemplary pipeline format. It is appreciated that a number of different pipeline formats may be adopted within the scope of the present invention that may operate within a number of different types of processors. Specific levels of detail put forth herein should not be construed as a limiting factor to construing the scope of the present invention.

For instance, the present invention may operate within processors of the Power PC™ and DEC Alpha™ generations and is not limited to the Intel Microprocessor Architecture.

Figure 1:
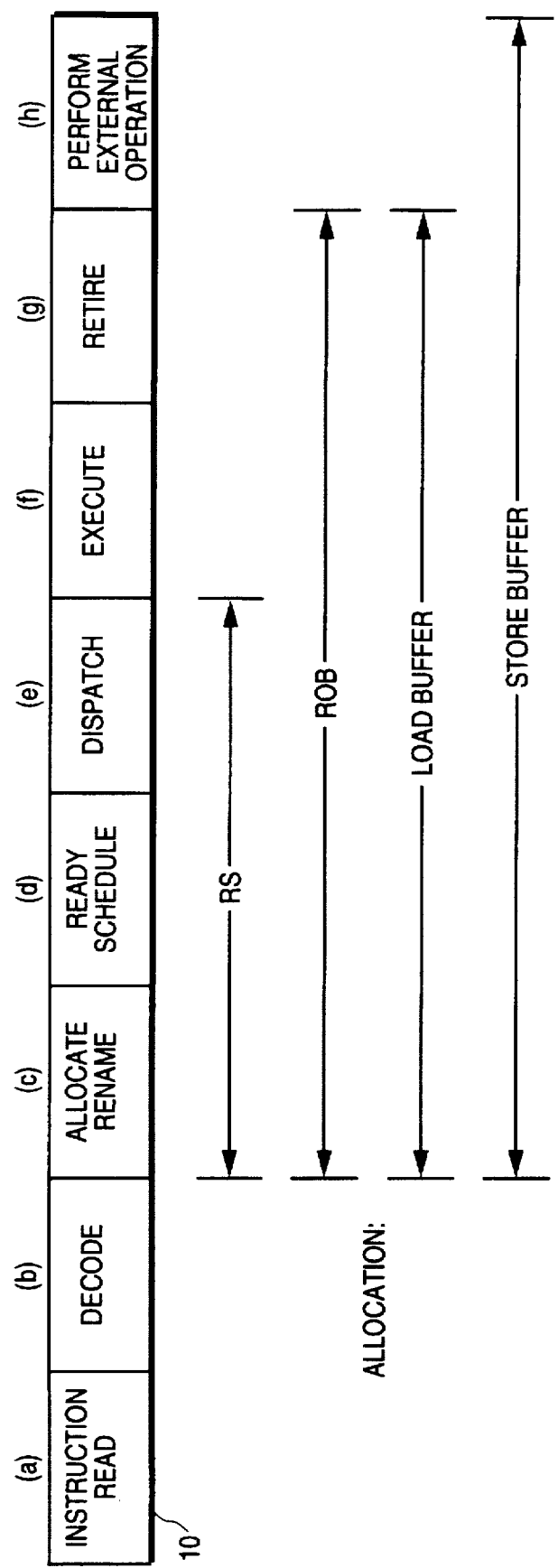
FIG. 1 illustrates an exemplary pipeline format of the present invention and allocation pipestages for the processor resources adopted by the present invention.

Refer to FIG. 1 which illustrates an exemplary and simplified pipeline format 10 of the present invention. The pipestages shown in FIG. 1 are exemplary only and may individually be composed of further pipestages as apparent in other discussions herein. Aspects of the pipestage format 10 are discussed in more detail to follow, however, presented below is a summary of the overall pipeline format. The pipestage begins and a group of instructions are read at pipestage 10(a) and decoded at pipestage 10(b). At pipestage 10(c), the buffer resources (ROB, RS, load and store buffer) are allocated to the current group of instructions and register renaming occurs, also, the instructions are placed into the RS where they are pending execution. At pipestage 10(d), some instructions within the RS that are pending execution are made ready and scheduled for execution. At pipestage 10(e), the scheduled instructions are dispatched from the RS to appropriate execution units where at pipestage 10(f) the instructions are executed and written back to the ROB and elsewhere. At stage pipestage 10(g), instructions of the ROB that belong to a properly predicted program path are retired and allowed to update an architecturally visible register file (RRF) or allowed to update the external bus. The pipeline ends at pipestage 10(g), however, at pipestage 10(h) some instructions (such as store instructions) are actually performed after retirement because they are buffered in the store buffer. A store operation is performed when it updates over the external bus.

Figure 2A:
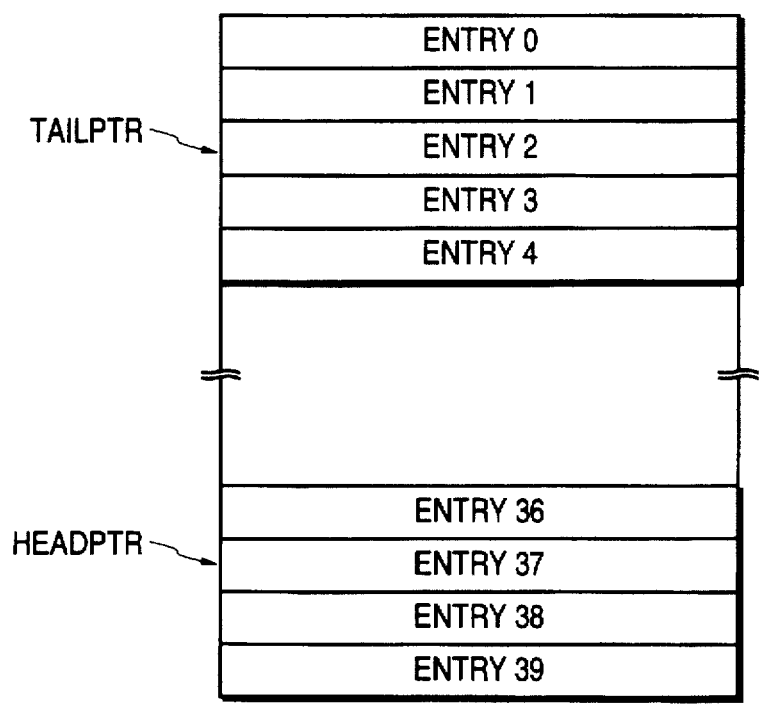
FIG. 2A is a block diagram of a sequential buffer allocation scheme of the present invention.
Figure 2B:
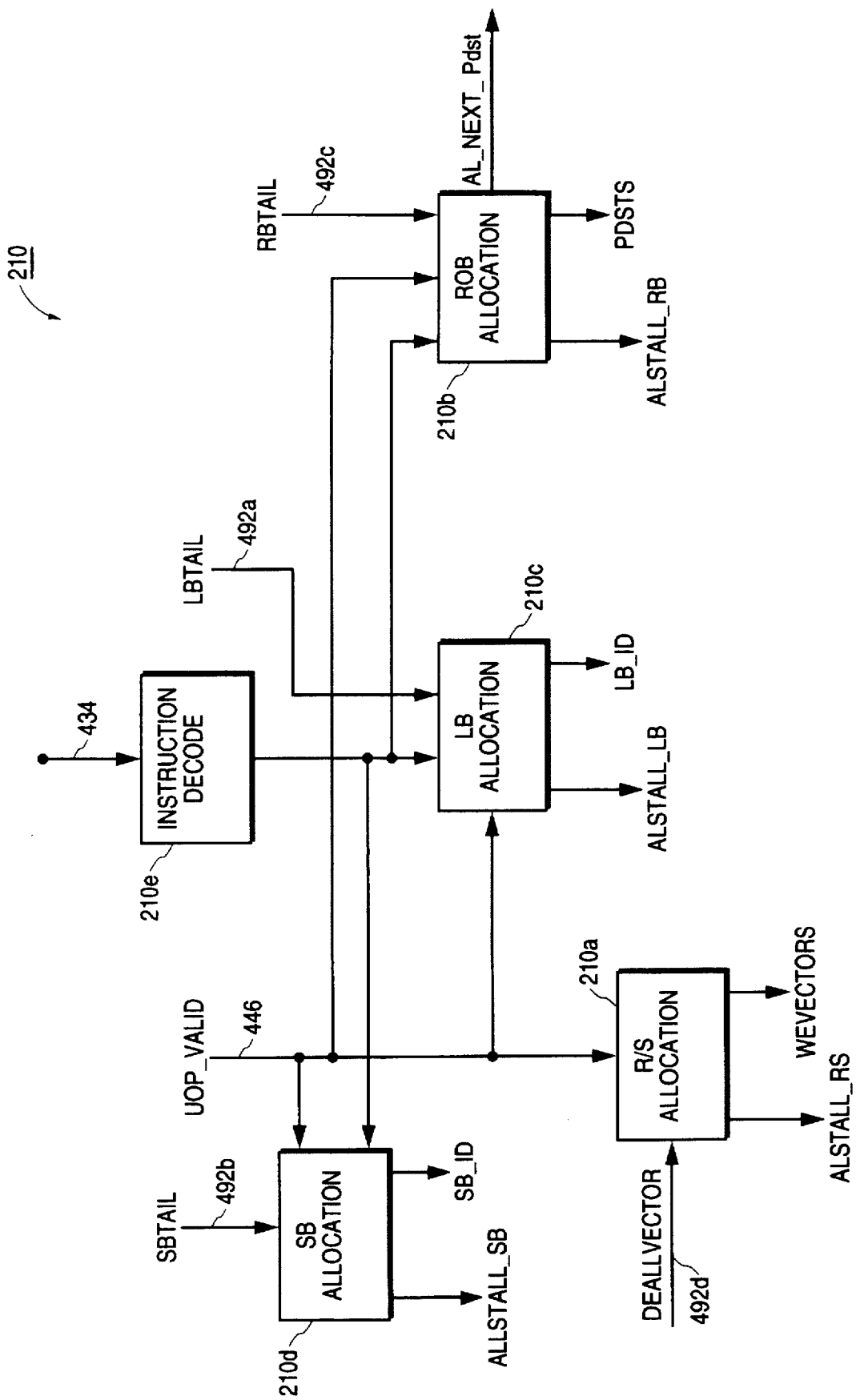
FIG. 2B illustrates the suballocator blocks of the allocator of the present invention.

Referring to FIG. 1 and FIG. 2B, the present invention allocates certain instructions to certain buffers. For each clock cycle, a predetermined number of instructions are issued from instruction stage 10(b) and are allocated to the appropriate buffers. Not all instructions are allocated to all buffers, thereby conserving resources. According to the present invention, all instructions are allocated an entry to the ROB 306 during allocation 10(c). Therefore, if four instructions were issued from pipestage 10(b) for a given clock cycle, there would be four entries allocated within ROB 306. All instructions, except for the floating point register exchange instruction (FXCH) are assigned an entry in the RS during allocation 10(c). The FXCH instruction is executed within the RAT by swapping a particular pair of register pointers to the ROB, therefore the FXCH does not have to be scheduled by the RS 305. According to the present invention, of the instructions issued from stage 10(b), only load instructions are allocated an entry of the load buffer, and similarly, only store instructions are allocated an entry of the store buffer. Both occur during allocation 10(c). FIG. 1 illustrates the allocation phases for each of the four buffers of the present invention as described below.

As described in more detail below, entries of the ROB are valid from allocation to retirement. Entries of the RS are valid from allocation to dispatch. Entries of the load buffer are valid from allocation until the load operation retires. Entries of the store buffer are valid from allocation until the store operation is performed over the external bus (which is typically post retirement).

According to the present invention, instructions are allocated to the ROB during allocation pipestage 10(c) by the allocator 210 (suballocator unit 210b) and remain allocated to the ROB until the instruction retires at pipestage 10(g). Upon retirement, the information and the entry of the ROB associated with the retiring instruction are made available for subsequent use and are deallocated (e.g., invalid). At retirement, the data from the ROB is allowed to update the RRF and therefore there is no need to contain retired instruction information within the ROB. According to the present invention, instructions (except for FXCH) are allocated to the reservation station 305 at allocation pipestage 10(c) by the allocator 210 (suballocator unit 210a) and remain allocated within entries of the RS until dispatch at pipestage 10(e). At dispatch, the instruction information is sent to the execution units where it becomes executed at pipestage 10(f) and therefore there is no longer a need for the instruction information to be allocated within the reservation station after dispatch.

Therefore, the instruction information associated with a dispatched instruction becomes deallocated (invalid) at dispatch and may be used for a subsequent allocation. It is appreciated that the entries of the reservation station become deallocated before retirement 10(g).

With reference to FIG. 1 and FIG. 2B, according to the present invention, load instructions are allocated to the load buffer (807) during allocation stage 10(c) by the allocator 210 (suballocator unit 210c) and are allocated until retirement when the load instruction updates the architecturally visible portions of the computer system and processor of the present invention.

Store instructions are allocated by the allocator 210 (suballocator unit 210d) at allocation 10(c) and remain allocated to the store buffer until the store operation occurs over the external bus 211. This may occur post retirement at stage 10(h). As discussed in more detail below, store instructions are placed into a store buffer (store address buffer 802 and store data buffer 701) after issuance. It is appreciated that because the store operations are buffered, the actual store operation for a given store instruction may occur after retirement because of the implementation of the store buffer. As the external bus interface allows, store operations are performed using the memory interface in an efficient manner which at times calls for store operations to be placed into a store buffer for subsequent processing. However, as soon as the store operation within the store buffer retires, to the processor of the present invention, the store instruction is complete. All that remains to be done is for the "senior" store operation to move from the store buffer onto the external bus. Therefore, store instructions are allocated within the store buffer post retirement 10(g). As shown in FIG. 1, stage 10(h) of the pipeline format provides for operations that occur post retirement.

It is appreciated that 10(h) is not actually an additional pipestage to the format 10 of the present invention, but is only illustrated as such to teach that store operations may occur subsequent to retirement. It is appreciated further that while the store buffer of the present invention is implemented as two separate buffers (one for address 802 and one for data 701) alternative implementations that are well known (e.g., using one buffer) may be used consistent within the scope of the present invention. For instance, a single store buffer for both address and data may be utilized within the present invention.

According to the present invention, the allocator 210 allocates entries of the resources differently. Load instructions are allocated to entries of the load buffer in a sequential manner. Store instructions are allocated to entries of the store buffer in a sequential manner. Instructions allocated to entries of the ROB are allocated in a sequential manner.

The reservation station (RS) 305 allocates on the basis of the first number of entries that are free. Because instructions within the RS may become dispatched at different times, the allocator scans the entries within the reservation station to locate the first number of entries that are free. In one implementation, four entries are allocated to the RS per clock cycle. These entries may be located anywhere in the RS. Therefore the allocator 210 scans the RS to locate the first four vacant entries, and these are allocated at stage 10(c). In another implementation, three entries are allocated to the RS per clock cycle. The allocation process for the RS is an all or nothing allocation in that if four (or three) vacancies are not found for a given clock cycle, the instruction fetch and issue portions of the processor must be stalled until the resources become available. It is appreciated that a number of different implementations may be adopted within the scope of the present invention for allocating entries to the reservation station 305, for instance, entries may be allocated to the RS based randomly, or otherwise nonsequentially. Allocated entries are sent over bus WEVECTORS.

It is appreciated that, for any of the buffers above, if insufficient vacancies exists at allocation to provide for the instructions that are issued at pipestage 10(b), then the front end of the processor (pipestages 10(a) and 10(b) must be stalled and instruction issuance delayed until resources become available within the four buffers. As shown in FIG. 2B, the allocator 210 contains a separate allocation unit for the ROB, the RS, the load buffer and the store buffer. If any unit determines its respective buffer is full, then the stall signal as described above is generated. The allocator 210 allocates entries of the respective buffers (ROB, RS, load, and store) by controlling write enable signals associated with the buffer entries and by sending entry address to the appropriate buffer to indicate the allocated entries. The allocator channels information regarding the presently issued and allocated instructions to the appropriate entries of the above buffers.

Sequential Allocation

The process utilized by the allocator 210 of the present invention for sequentially allocating entries of the ROB, load and store buffers is now discussed. Although discussed with reference to the ROB, it is appreciated that the following sequential allocation procedure may be applied to allocation performed by the allocator 210 for entries of the load and store buffer. The allocator 210 is located within an in-order issue cluster of the processor of the present invention. The instructions generated from pipestage 10(b) are input to the allocator 210. In general, the allocator 210 allocates resources necessary to execute each instruction. Within the following discussion reference is made to FIG. 2A, FIG. 3, FIG. 4B, FIG. 5, and FIG. 6.

The ROB 306 contains a circular buffer to store n entries, wherein each entry stores the results of executed instructions. The allocator 210 allocates an entry in ROB 306 for each instruction. The allocator 210 allocates and deallocates entries in the ROB 306 in a FIFO manner. Upon allocation of a instruction to a reorder buffer entry, the allocator 210 provides a reorder unit of the ROB with physical destination addresses to identify the allocation. During the high phase of the system clock, the allocator 210 provides the three physical destination addresses to the reorder unit. In a subsequent low phase of the clock cycle, the in-order fetch and issue cluster unit 201 provides information to write entries into the ROB 306. On the low phase of the clock cycle, ROB 306 entries receive data. In a preferred embodiment, up to three or four instructions are allocated in the ROB 306 in any given clock.

The allocator 210 interacts with both the in-order and out-of-order sections of the processor. Specifically, the allocator 210 interacts with instruction issue block 210 (including a branch target buffer), register alias table (RAT) 214, the integer execution unit 302, ROB 306, RS 305, and MOB 503. During each clock cycle of the processor 212, the allocator 210 prepares to allocate three ROB 306, RS 305, and load buffer entries within MOB 503. In addition, the allocator 210 prepares to issue two store buffer entries within MOB 503. In order to allocate the appropriate resources, the allocator 210 generates pointers to the appropriate resources by decoding the instructions input from the instruction issue unit 210. The decoded instructions permit the allocator 210 to ascertain specific resources required for the instructions. In addition, the decoded instructions indicate a specific RS 305 dispatch port. The decoded instructions contain a instruction valid bit that permits the allocator 210 to further qualify resources required. Based on the resources required and validity of the instructions, the allocator 210 ascertains the availability of resources for the instructions.

FIG. 2A illustrates a logical diagram of the ROB 306 buffer configured in accordance with the present invention. The ROB 306 buffer contains a predetermined number of entries, wherein each entry is identified by a Pdst. In addition to sequentially identifying each entry in the buffer, each Pdst contains a wrap bit. The wrap bit comprises the most significant bit of the Pdst. The allocation unit 210 allocates entries for instructions in a first in first out (FIFO) manner. The ROB 306 buffer is a circular buffer, such that allocation of the last entry is followed by allocation of entry 0. Each time the allocation unit 210 traverses the entire circular buffer, the allocation unit 210 toggles the wrap bit. The wrap bit is utilized to distinguish between empty and full conditions of the buffer. In order to allocate entries in the ROB 306 to instructions, the allocation unit 210 compares the tail pointer and the head pointer. The head pointer indicates the first valid entry (or the next valid entry) and the tail pointer indicates the last valid entry. If the tail pointer and the head pointer match and contain equivalent wrap bits, then the ROB 306 buffer is empty. If the tail pointer and the head pointer match and the wrap bits are different, then the ROB 306 buffer is full. For the example shown in FIG. 2A, the tail pointer points to entry 2, and the head pointer points to entry 37. If the wrap bits for the head pointer and tail pointer are equivalent, then entries 3 through 37 are available for allocation.

The ROB 306 buffer entries are allocated and deallocated sequentially. In a preferred embodiment, the issue unit 201 issues three (or four) instructions per clock cycle and for each clock cycle, the allocation unit 210 seeks to allocate three (or four) free slots in the ROB 306. If three empty slots are not available, then the processor must stall the issue unit 201. If three empty slots are available, then the allocator 210 transmits three Pdsts to the ROB 306. The three Pdsts indicate the three empty slots for use with the three incoming instructions issued for that clock cycle. The tail pointer, generated by the ROB 306, is input to the allocator 210. Whenever a retirement from the ROB 306 occurs, the ROB 306 increments the tail pointer. At the end of the allocation cycle, the address of the last ROB entry allocated is preserved and utilized as a new starting point for the next allocation cycle.

The allocation unit 210 utilizes an all or nothing allocation policy. The allocator 210 determines whether three entries, one for each instruction, are available. If three entries are not available, then no entries in the ROB 306 are allocated for any of the instructions. Consequently, the ROB allocation is independent of the type of instruction or whether the instruction is valid. The all or nothing allocation policy of the present invention simplifies subsequent ROB 306 buffer writes. For example, if only a portion of the instructions from a particular clock cycle were allocated to the ROB 306 buffer, additional logic would be required to write operand data corresponding to the instructions from two different clock cycles. In addition to reducing logic, allocation is accomplished more quickly than allocating a portion of the instructions. The all or nothing allocation policy is particularly advantageous in ROB allocation of the present invention because every instruction needs a ROB entry.

Refer to FIG. 2B which illustrates components of the allocator 210 of the present invention. The ROB sequential allocation process as described above occurs within the ROB suballocator block 210b. The above sequential allocation structure and operation is also applicable to allocation of the store buffer and the load buffer. However, regarding the store buffer, of the instructions issued from 201, only store instructions are allocated therein and this allocation is performed by the SB suballocator 210d. Regarding the load buffer, of the instructions issued from 201, only load instructions are allocated therein and this allocation is performed by the LB suballocator 210c. In addition to the ROB suballocator 210b, the load buffer suballocator 210c, and the store buffer suballocator 210d, the allocator is also composed of a reservation station suballocator block 210a that performs the nonsequential allocation.

Suballocator 210d receives the tail pointer of the store buffer 802 over line 492b. This tail updates as store entries are deallocated. Suballocator 210c receives the tail pointer of the load buffer 807 over line 492a. This tail updates as load entries are deallocated at retirement. Suballocator 210b receives the tail pointer of the ROB buffer 306 over line 492c. This tail updates as ROB entries are deallocated at retirement. The RS suballocator 210a receives a deallocation vector from the RS 305 over bus 492d which indicates those entries that were dispatched and thus deallocated. Each suballocator is capable of generating a stall signal (ALStall_SB, ALStall_LB, ALStall_RB, and ALStall_RS) indicating that their respective buffer is full. These signals are OR'ed to together to generate an allocator stall. Each of the suballocator units also receives uop valid signal 446 to indicate whether or not the uops of a current cycle are valid. The allocator also contains a uop decoder block 210e for determining which uops are loads and stores and which uops require the reservation station (all except for FXCH).

The suballocators of FIG. 2B maintain the current addresses pointed to by the head pointers for the ROB, the store buffer, and the load buffer so that during allocation the appropriate new addresses can be generated if and when needed. The tail pointer for the load buffer, the ROB and the store buffer is generated by each respective buffer (and updated during deallocation) and sent to the respective suballocator (store buffer, load buffer, ROB) so that the suballocator is informed of the buffer full status. The RS suballocator also maintains a list of vacant RS entries and each cycle generates write enable vectors to indicate the entries allocated for a given cycle. The allocator uses all of the above information to determine allocator stall generation; any of the suballocators may generate a stall signal. Thus, the load buffer, the ROB, and the store buffer communicate the value of the tail pointer to the allocator so that the allocator may track deallocation of the entries at retirement or when store instructions are performed. Further, the RS 305 communicates to the allocator those entries that become dispatched and therefore deallocated.

The SB suballocator 210d generates a list of store buffer IDs (SB_ID) for each store instruction and this indicates the allocated entry for that store instruction. This information is sent to the reservation station entry of the store operation for use when store information is actually placed into the store buffer. Similarly, the LB suballocator 210c generates a list of load buffer IDs (LD_ID) for each load instruction and indicates the allocated entry for that load instruction. This information is sent to the reservation station entry allocated to the load instruction and is for use when the load information is placed into the load buffer. The ROB suballocator 210b generates and sends to the ROB 306 and RAT 214 a list of newly allocated Pdsts. The RS suballocator 210a generates and sends to the RS 305 a write enable vectors (WEVECTORS) indicates those entries allocated in the RS 305.

The following describes the hardware environment of the computer system and processor of the present invention as well as the store buffer, load buffer, reservation station and reorder buffer of the present invention in further detail.

PART II—HARDWARE ENVIRONMENT

Figure 3:
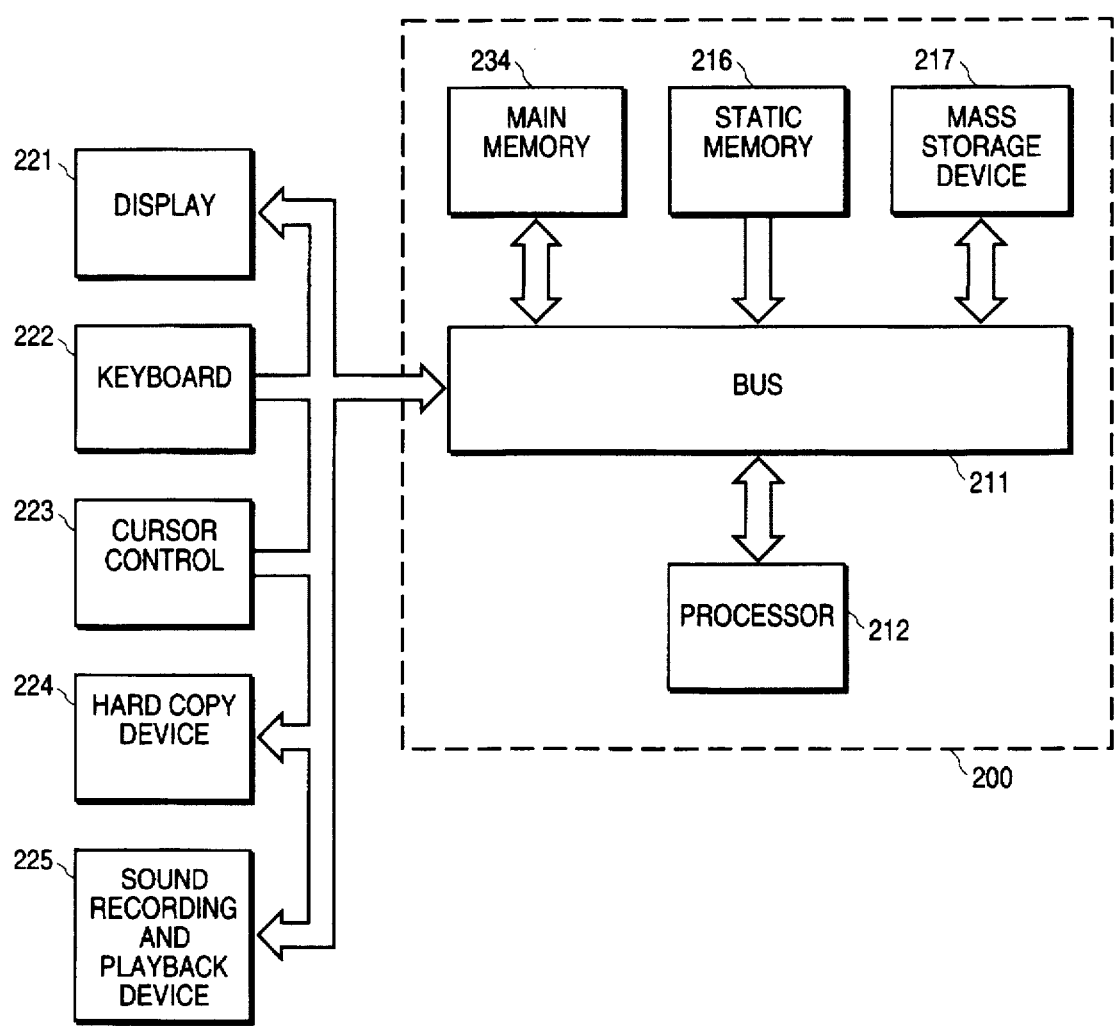
FIG. 3 is a block diagram of the present invention computer system.

Referring to FIG. 3, the computer system upon which a preferred embodiment of the present invention is implemented is shown as 200. Computer system 200 comprises an address/data bus or other communication mechanism 211 for communicating information, and a processing mechanism 212 coupled with bus 211 for executing instructions and processing information. Processor 212 includes, but is not limited to microprocessors such as an Intel Architecture Microprocessor, manufactured by Intel Corporation of Santa Clara, Calif., processor 212 may also be another microprocessor such as the PowerPC™, Alpha™, etc. and may be implemented using silicon or gallium arsenide. Processor 212 may be implemented on a single chip or within multiple chips. System 200 further comprises a random access memory (RAM) or other dynamic storage device 234 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

Figure 4A:
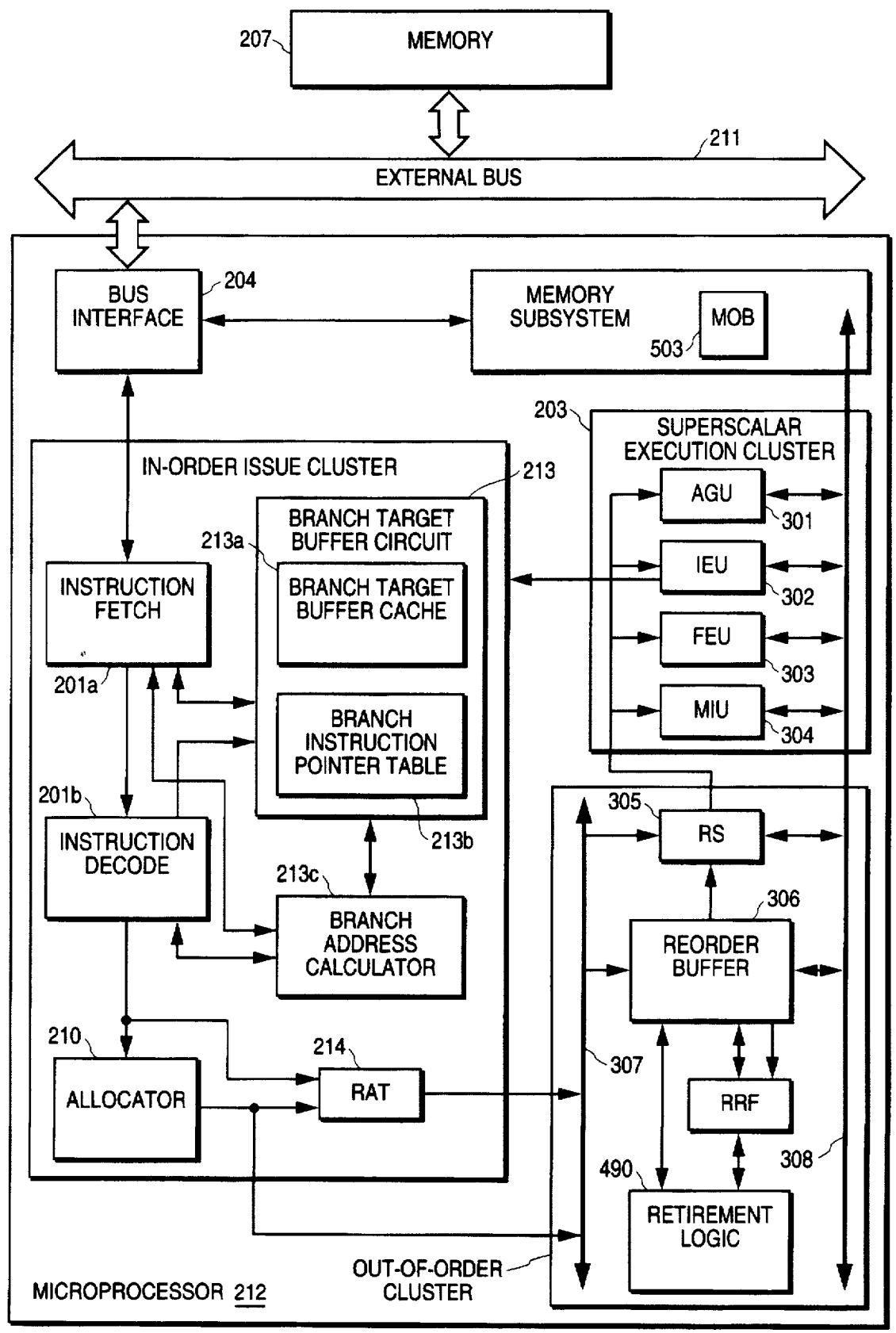
FIG. 4A is a block diagram of the general components of the present invention processor.

FIG. 4A illustrates a general block diagram of the processor 212 of the present invention. The components of the processor 212 are shown in FIG. 4A to provide the general structure and interface of the processor of the present invention. Generally, processor 212 is composed of an in-order portion and an out-of-order portion as shown. The branch target circuit 213, BTB cache 213a, branch instruction pointer 213b and the branch address calculator 213c perform speculative instruction execution by predicting program branch results to provide the pipeline with a steady source of instructions. The register alias table 214 performs register renaming and is the last stage of the in-order pipeline. Instructions flowing from the out-of-order portion retire to the real register file (RRF) in program code order. The reservation station 305 and the reorder buffer 306 are illustrated. The load and store buffer of the present invention are located in the memory order buffer 503. An external bus 211, a writeback bus 308 and internal bus 307 are also illustrated. The above components and the balance of the components of processor 212 are described in further detail within relevant portions of the discussion hereinafter. Memory 207 (which may be of RAM 234 and/or ROM 216) for containing instruction and data information is coupled to bus 211.

Figure 4B:
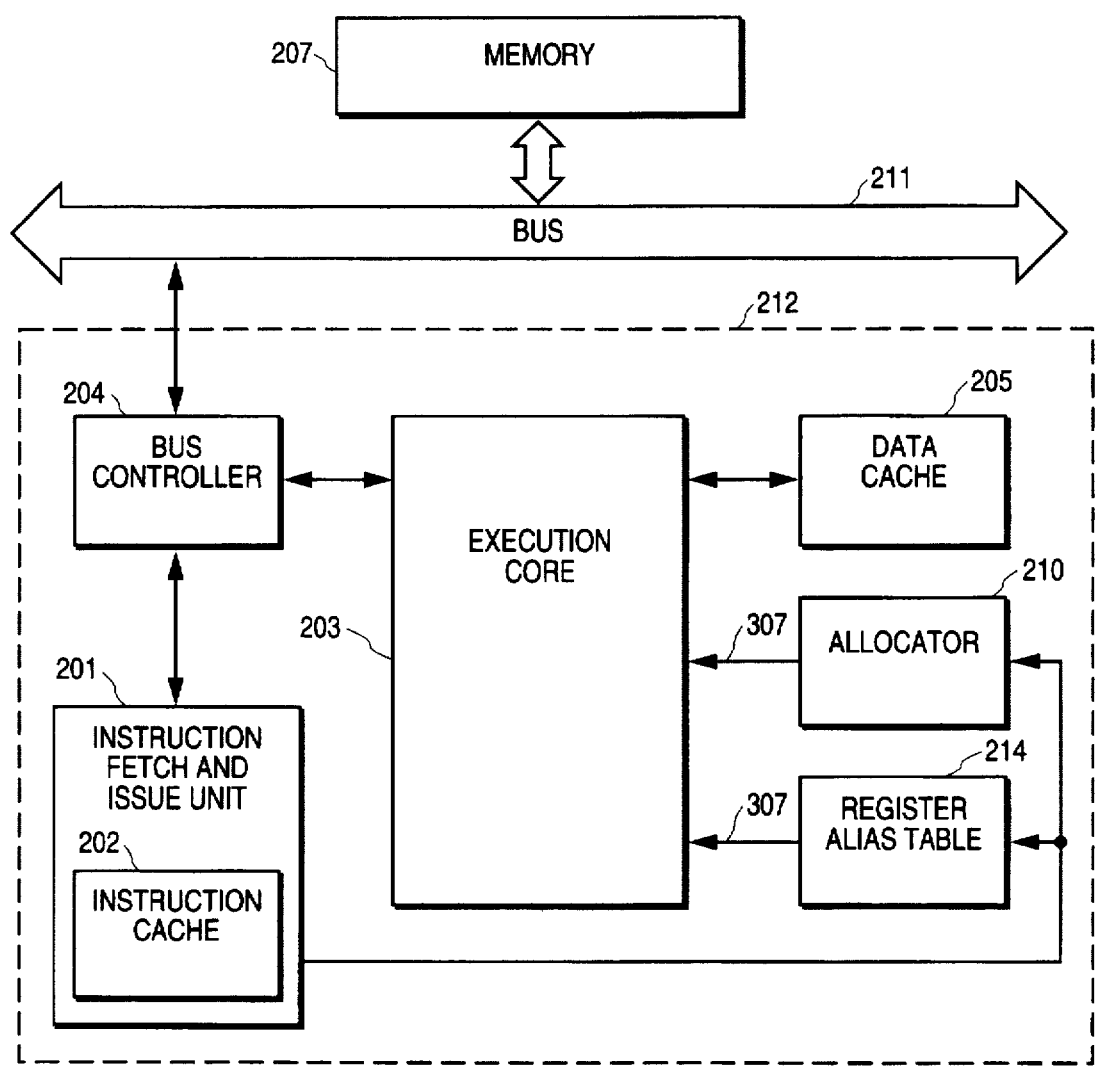
FIG. 4B is a block diagram of subsystems of the present invention processor.

FIG. 4B is a block diagram of the memory subsystem of the processor 212 of the present invention. The memory subsystem comprises an instruction fetch and issue unit 201 with an integrated instruction cache 202, an execution core 203, a bus controller 204, a data cache memory 205, a memory unit 207, and a bus 211. The memory unit 207 (RAM 214 and/or ROM 216) is coupled to the system bus 211. The bus controller 204 is coupled to the bus 211. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. The instruction fetch and issue unit 201 of the processor 212, the execution core 203, the bus controller 204, and the data cache memory 205, together with the other general components of FIG. 4A, comprise the processor 212. Elements 201–205 cooperate to fetch, issue, execute and save the execution results of instructions in a pipelined manner. The bus controller 204, the bus 208, and the memory 207 are also intended to represent a broad category of these elements found in most computer systems. Their functions and constitutions are well-known and are not described further.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 112. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively. The instruction fetch and issue unit 201 may fetch a multiple number of instructions (e.g., 1, 2, 3, or 4) within a common clock cycle. Instruction fetch and issue unit 201 is intended to represent a broad category of instruction fetching and issuing elements found in many computer systems. Their constitutions and functions are well-known and will be described only as necessary with reference to later figures.

The execution core 203 of the processor 212 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 205 of FIG. 4B responds to the load instructions immediately, forwarding data if necessary, whereas the store instructions are buffered. In other words, the instructions are not necessarily executed/forwarded in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an non-affirmed branch prediction. The execution core 203, incorporating with the teachings of the present invention, and the data cache memory 205 will be described further in detail below.

The instruction fetch and issue unit 201 of FIG. 4B transfers the stream of instructions (uops) to a register alias table (RAT) 214 and an allocator 210. In one embodiment, the instruction fetch and issue unit 102 issues up to three (or four) in-order uops during each cycle of the processor. The allocator 210 assigns each incoming uop to a location (entry) in a reorder buffer (ROB) 306, thereby mapping the logical destination address (LDST) of the uop to a corresponding physical destination address (Pdst) in the ROB. A register alias table (RAT) 214 maintains this mapping. By renaming the registers used by the instructions to a larger set of physical registers that reside in the ROB, false data dependencies between instructions may be removed allowing additional parallel execution of instructions. As discussed above, the allocator allocates entries to the load buffer, the store buffer, the ROB and the reservation station.

The contents of a ROB register are retired to a location in a real register file (RRF). The RAT 214 thus also stores a real register file valid bit (RRFV) that indicates whether the value indicated by the logical address is to be found at the physical address in the ROB or in the RRF after retirement. Based upon this mapping, the RAT 214 also associates every logical source address to a corresponding location in the ROB or the RRF (the source operand of one instruction generally must have been the destination of a previous instruction). The structure and function of the ROB 306 will be described to follow.

Figure 5:
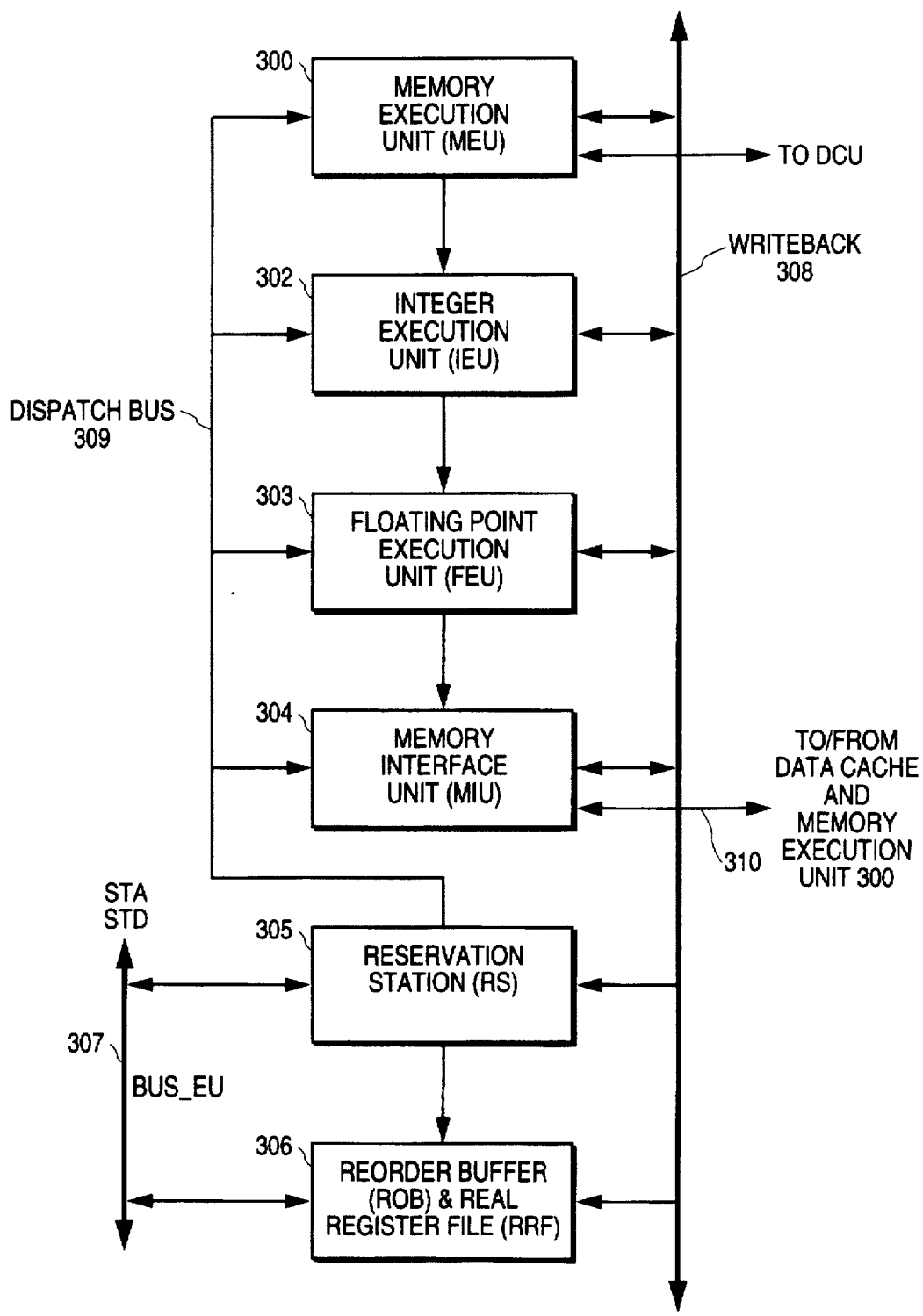
FIG. 5 is a block diagram a present invention execution unit embodiment.

FIG. 5 is a block diagram of one embodiment of the execution core of the processor 212 of the present invention. Execution core 203 comprises a reservation station (RS) 305, a memory execution unit MEU 300, an integer execution unit (IEU) 302, a floating point execution unit (FEU) 303, a memory interface unit (MIU) 304, an architecturally invisible reorder buffer (ROB) and an architecturally visible real register file (RRF) 306. Additionally, execution core 203 includes an internal bus (Bus_EU) 307 and a writeback bus 308. The MEU 300, AGU 301, IEU 302, FEU 303 and MIU 304 are all coupled to reservation station 305 via a dispatch bus 309. They are also coupled to writeback bus 308. The MIU 304 is also coupled to the data cache memory and MEU 300 via bus 310. RS 305 is coupled to the writeback bus 308 and the Bus_EU 307. The RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores information pertaining to the issued instructions that are pending execution and resolves their operands with data from the IEU 302, the FEU 303, the data cache memory, the ROB and RRF 306 and holds them until their operands are all resolved. The RS 305 then dispatches the issued instructions to the AGU 301, the IEU 302, the FEU 303 and the MIU 304 and the MEU 300 as appropriate. In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

Each incoming uop is also assigned and written into an entry in the reservation station 305 by the allocator 210. The reservation station (RS) 305 of FIG. 5 assembles the instructions awaiting execution by an appropriate execution unit, such as integer execution unit 302 or memory execution unit (MEM EU) 300. The use of register renaming in the ROB 306 not only avoids register resource dependencies to permit out-of-order execution, but also plays a role in speculative execution since the ROB contains only speculative data. If an instruction sequence is considered to be part of a predicted branch, then the execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's register file (RRF). If the predicted branch affected the values in the RRF, then it would be difficult to recover from branch misprediction because it would be difficult to determine the values stored in the registers before the predicted branch was taken without the use of redundant registers in the ROB.

After execution within one of the execution units, when a result is produced, it is written to the ROB 306. The result may provide an input operand to one or more waiting instructions buffered in the reservation station, indicating that the source operand is ready for dispatch to one or more execution units along with the instructions using the operand. In the general case, instruction information held within the reservation station will source the ROB to obtain operand data and this information is forwarded to the appropriate execution units for execution when an instruction is scheduled and dispatched. When the checking logic of the processor determines that a particular instruction is associated with a properly predicted branch, and all other conditions are satisfied, an instruction that has been executed and placed into the ROB may retire. The associated physical register (Pdst) of that retiring instruction is then written into the RRF and becomes architecturally visible.

The MEU 300, the IEU 302, FEU 303, and the MIU 304 in turn perform their operations accordingly. The execution results of the integer, floating point and load instructions are held in the reorder buffer (ROB) 306, and then committed by RRF 306 in the order these instructions were issued. Speculative execution results of the mispredicted branches are not committed, but instead are held in the ROB 306 and deallocated upon their retirement. The ROB 306 is discussed further below.

Regarding the structure of the present invention processor 212, the following terminology describes the relevant processing stages of the instructions. The Issue stage refers to the merging of the in-order stream of instruction from the issue cluster (204, 201, 202) with the corresponding source data which is provided by the ROB 306 and then placing this information into the reservation station 305. Within the issue stage, registers used by the instruction are renamed to registers within the ROB and this renaming occurs within the RAT 214. At the Issue stage, instructions may be part of a speculative program path as a result of a branch prediction. Also at the Issue stage, instruction information is allocated at an Allocation stage. The Ready/Schedule stage identifies all the instructions ready to execute (Ready stage) that are pending in the RS 305 a selects (Schedules) a group (e.g., by FIFO or similar process) for execution and also schedules an execution unit (e.g., 300, 302, 303). For a given clock cycle, not all instructions that are ready are scheduled. At Dispatch, the scheduled instructions are forwarded to a selected execution (functional) unit. At Writeback, the results generated by the functional units are written into appropriate entries of the ROB. Also, the writeback ports are examined for results that are sources of instructions pending in the RS 305 so that the data-ready status of these pending instructions may be updated. At Retirement, the results from the ROB that pertain to instructions that are properly predicted and also executed and placed into an architecturally visible buffer (the RRF) in their original issued order. Upon misprediction, the speculative data in the ROB is cleared.

Figure 6:
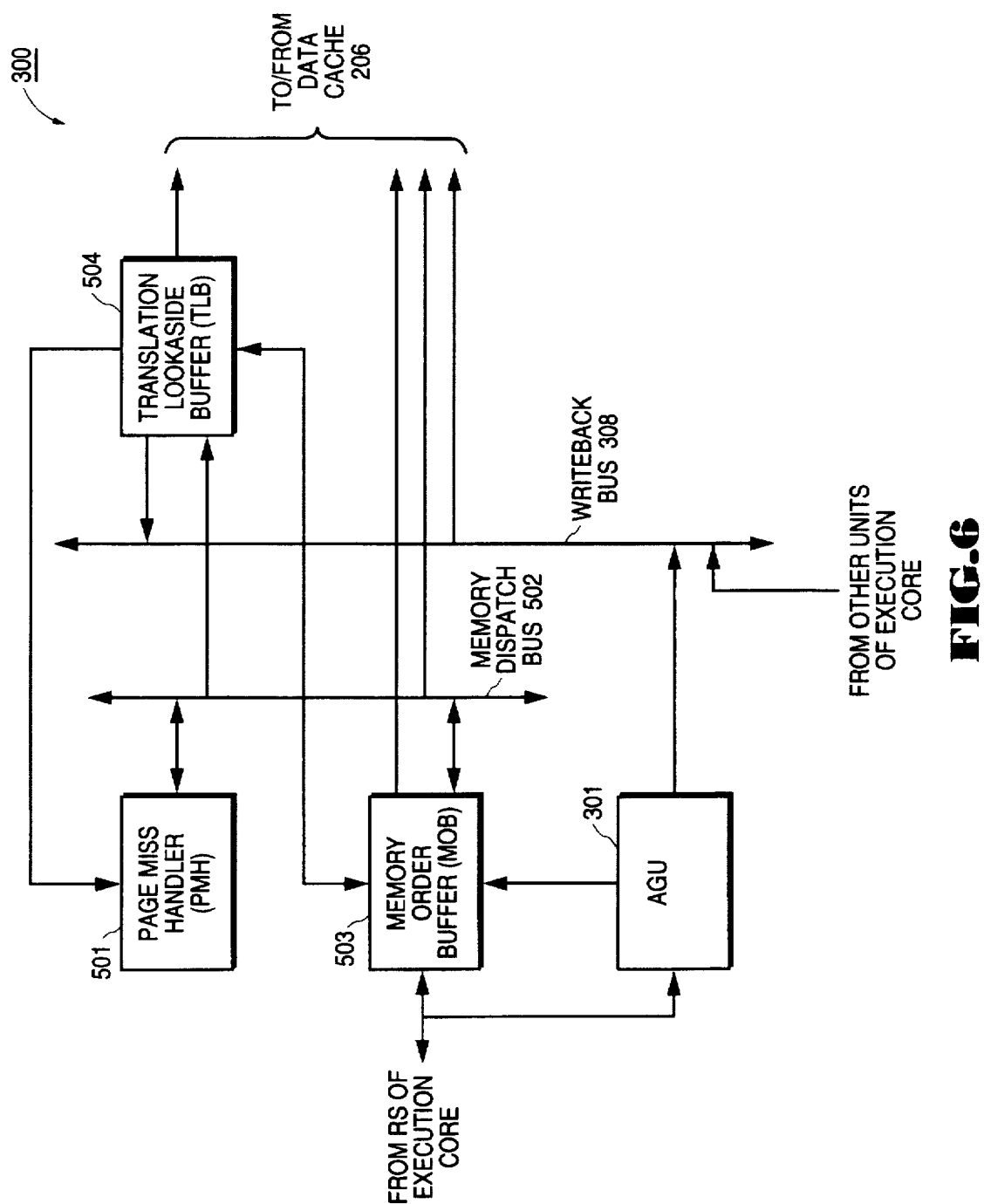
FIG. 6 is a block diagram of pertinent parts of the present invention cache controller.

FIG. 6 depicts a block diagram of the relevant portions of one embodiment of the memory execution unit (MEU) of the present invention. The MEU 205 includes AGU 301, page miss handler 501, memory order buffer (MOB) 503, and translation lookaside buffer (TLB) 504, as well as memory dispatch 502 and the writeback bus 308. The PMH 501 is coupled to the memory dispatch bus 502, writeback bus 308, and TLB 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory. Memory dispatch bus 502 and writeback bus 308 are also coupled to the data cache memory. AGU 301 is coupled to MOB 503, the writeback bus 308, and the dispatch bus 309.

The AGU 301, MOB 503, PMH 501, and TLB 504 control all load accesses to the data cache memory and, in turn, the memory of the computer system. The AGU 301, MOB 503, PMH 501, and TLB 504 also execute the STA portion of the store. Specifically, MOB 503 buffers the results of the STA execution for the eventual store dispatch to the data cache memory. The AGU 301 generates the appropriate linear address for the memory operations. The AGU 301 computes the linear address using a base address, a displacement value, a scale value, an index value and a segment value. The linear address is 32-bits long with a 20 higher order bits identifying a memory page and the 12 low order bits identifying the off-set within the memory page. Reference to a linear address (LA) refers to a 32 bit address composed of a page reference high order portion and an offset lower order portion. Further, reference to a physical address (PA) refers to a 40 bit address composed of a page address high order portion and an offset lower order portion.

TLB 504 translates the 32-bit linear address into a 36-bit physical address with 24 higher order bits indicating the memory page, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively, MOB 503 controls the necessary monitoring and dispatched these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions. The TLB 504 and the PMH 501 are intended to represent a broad category of these elements found in most computer systems. MOB 503 will be described in further detail below.

Figure 7:
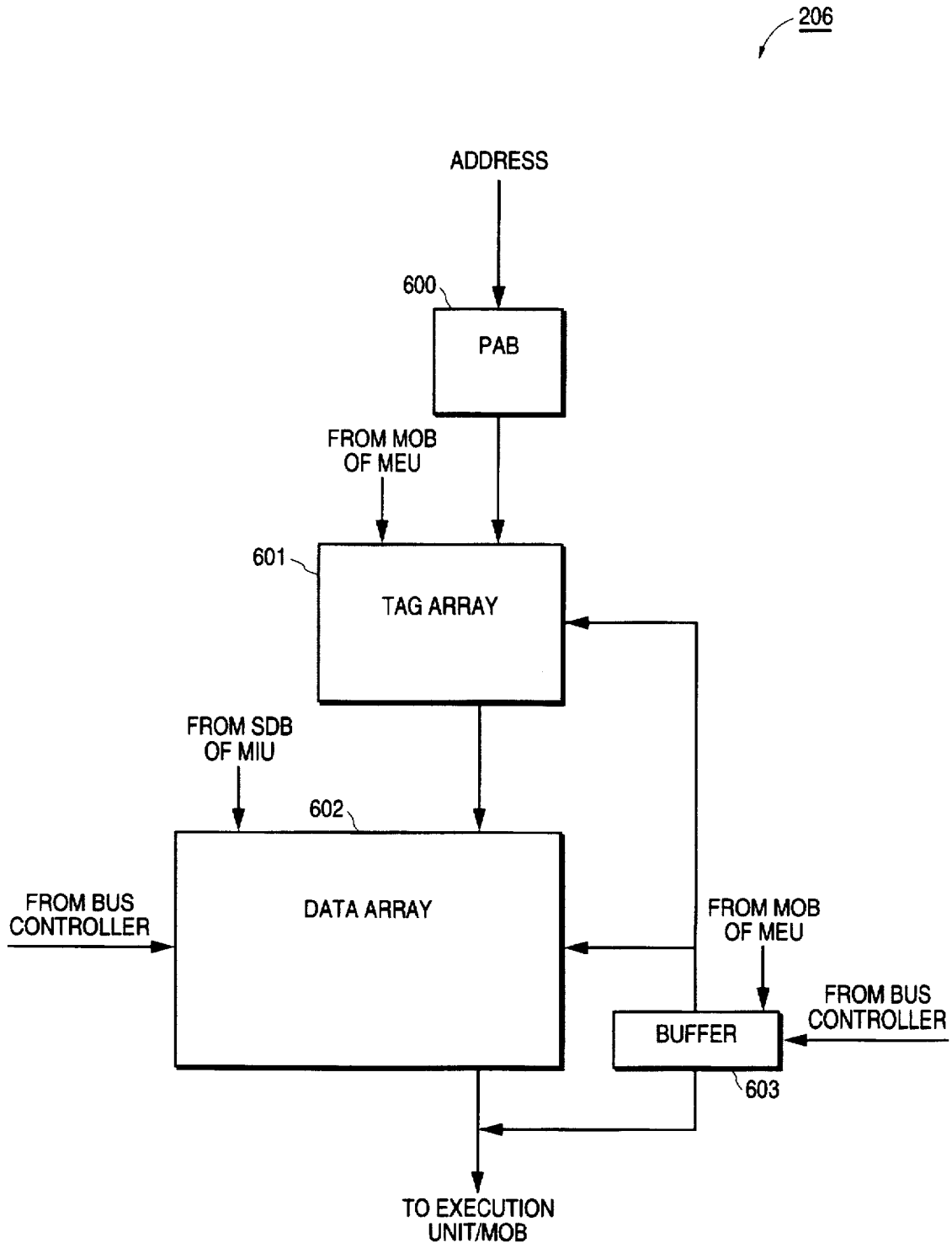
FIG. 7 is a block diagram of the pertinent parts of the present invention data cache unit.

FIG. 7 is a block diagram of one embodiment of the data cache memory of the present invention. The data cache memory 206 comprises a physical address buffer (PAB) 600, data tag array 601 and a data array 602 and queue 603. PAB 600 is coupled to receive an input (e.g., the physical address) from the TLB of the MEU and is coupled to produce physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller. In response, data array 602 produces an output to the execution core.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. Data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. The queue 603 includes four entries having a 256 bit width (one cache line).

Figure 8:
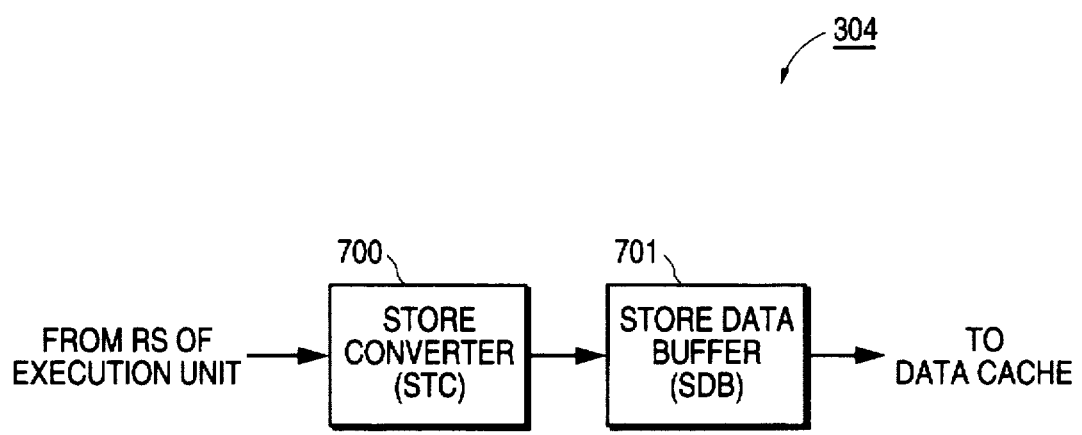
FIG. 8 is a block diagram of the relevant parts of present invention memory interface.

FIG. 8 is a block diagram of one embodiment of the relevant portions of the MIU of the execution unit of the present invention. The MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the MEU, and the PAB of the data cache, commits the STD operations as appropriate, and causes them to be dispatched (with their corresponding STA operations) to memory. The SDB 701 includes 12 entries, each for storing a single STD operation. Each entry is capable of storing 64 bits of data. Each entry in the SDB corresponds to an entry in the SAB and the PAB. There is a one-to-one correspondence between the entries. The STA and STD operations are assigned entries when issued. The assignment is in the form of an ID, referred to as the store buffer ID (SBID). The functions and constitutions of the STC 700 are well-known and will not be further described. SDB 701 and its cooperation with the SAB and PAB, will be described in further detail below.

PART III—STORE BUFFER

Figure 9:
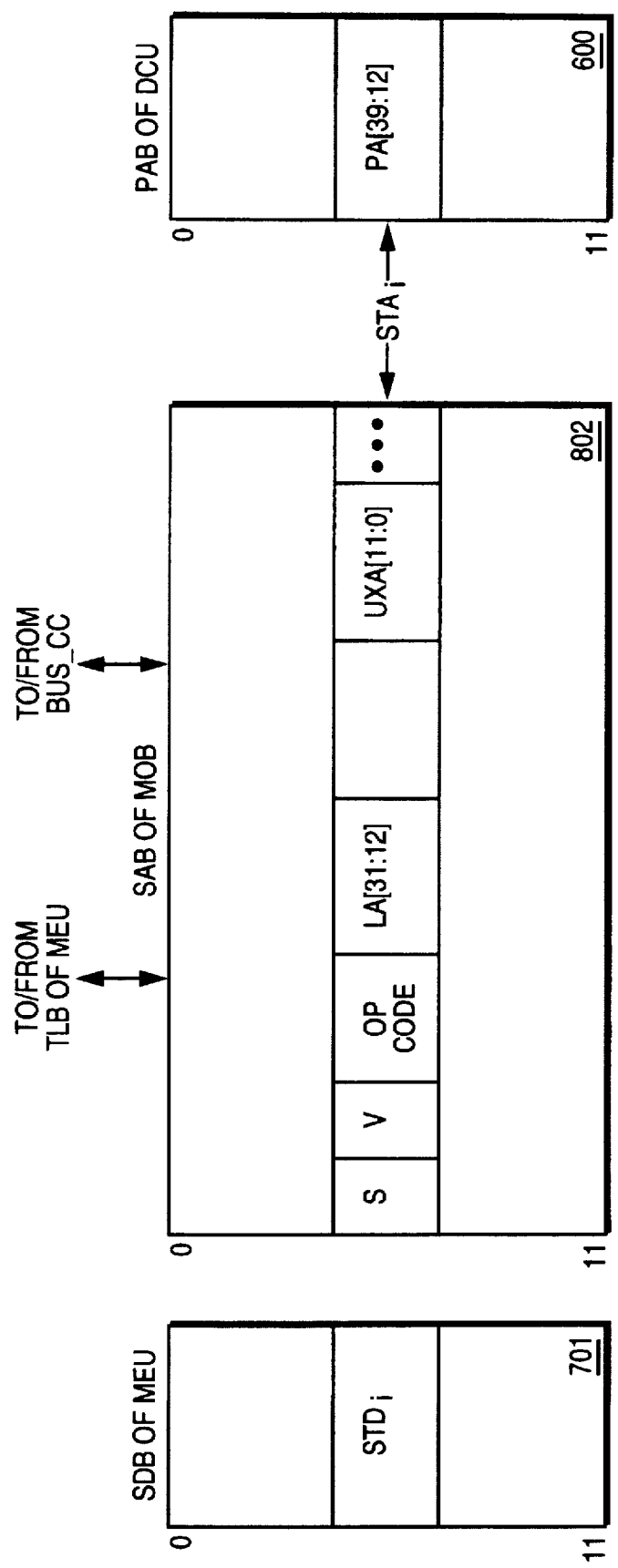
FIG. 9 is a block diagram depicting the interaction between the store address buffer the store data buffer and the physical address buffer of the present invention.

FIG. 9 is a block diagram of one embodiment of the PAB, the SDB and the SAB. The SAB 802 is coupled to the TLB of the MEU and Bus_CC. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed (e.g., performed) in the "background" in due course when the data cache is free and then purged from the SDB 701, the SAB 802 and the PAB 600. The STD and STA operations of some of the store instructions, such as those storing data to memory locations mapped to I/0 devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. The linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Store Operations

Figure 10A:
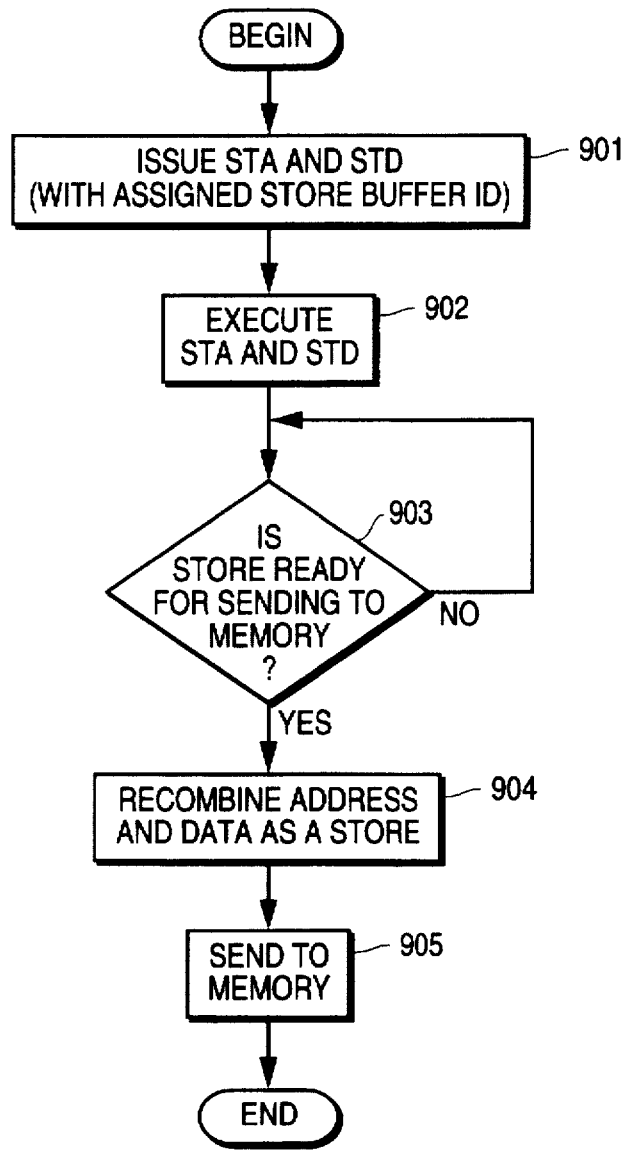
FIG. 10A is a flow chart depicting the process of the present invention for performing store operations.

The process for performing store operations is shown in FIG. 10A. Each store operation is received and executed by a processor and the store operation is received as a store instruction. In response to receiving a store instruction, a store data (STD) and store address (STA) instructions are issued (processing block 901). Store buffer entries are allocated by the allocator 210 during the allocation pipestage 10(c). The STD and STA instructions are then executed independently and possibly in parallel, depending on the availability of resources (processing block 902). A determination is then made as to whether the store is ready to send to memory (processing block 903). Once it is determined that the store is ready to be sent to memory over the external bus 211 (e.g., ready to be committed to an architecturally visible processor state), the address and data results from the execution of the STA and STD instructions respectively, are recombined as a single store operation (processing block 904). Once the store has been recombined, the store is sent to memory for completion (processing block 905). It is appreciated that a store may be sent to memory over the external bus after retirement. A store is not deallocated from the store buffer until it is sent to memory (e.g., performed).

The processor 212 receives a stream of instructions and initially generates a sequence of micro-instructions, including the STA and STD micro-instructions. The stream of instructions is usually received by the processor in response to an instruction fetch initiated by the processor. The micro-instructions are generated by a decoder in the instruction fetch and issue unit. The micro-instructions are issued in order as the processor reads the instruction. The STA and STD micro-instructions are then issued to the execution core of the processor for execution. Because of the multiple buffer entries for the SDB, SAB and PAB, if multiple AGUs and multiple execution units are within the execution core, then the execution core of the present invention may execute multiple STA/STD pairs at the same time in parallel. Furthermore, STA/STD pairs may execute out-of-order where there are no conflicts or dependencies between the store operations.

Figure 10B:
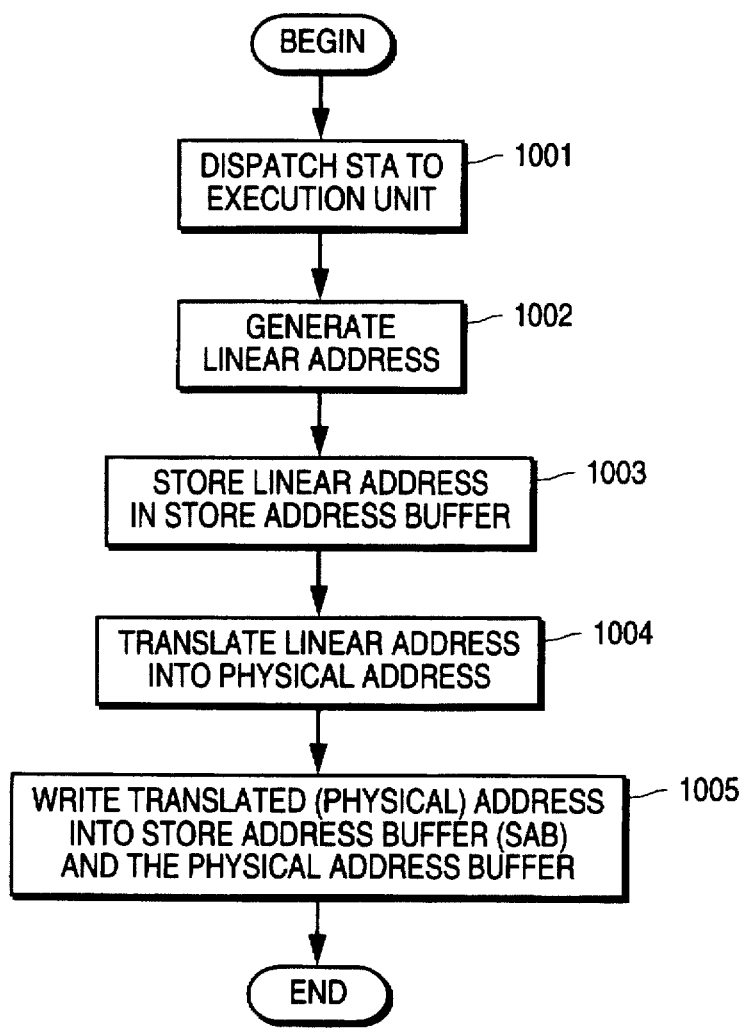
FIG. 10B is a flow chart depicting the execution process of a store address (STA) instruction.
Figure 10C:
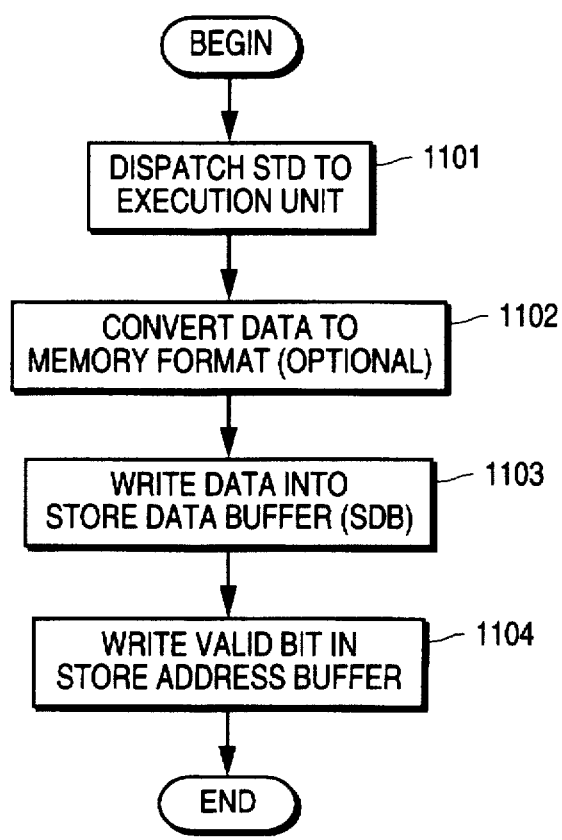
FIG. 10C is a flow chart depicting the execution process of a store data (STD) instruction.

FIGS. 10B and 10C are flow charts depicting the execution of the STA and STD microinstructions respectively. If the execution of instructions is performed out-of-order, such that subsequently issued microinstructions are executed before previously issued microinstructions, then the STA and STD instructions are scheduled for execution by the reservation station. That is, the reservation station receives the STA and STD microinstructions determines when these microinstructions, and any other received microinstructions, may be sent to be executed. The determination of when a particular microinstruction may be sent for execution is based on the availability of resources (e.g., AGUs, ALUs, etc.), as well as any true data dependencies that exist between the microinstructions.

Referring to FIG. 10B, the execution of a STA microinstruction begins when it is dispatched to an execution unit (processing block 1001). The STA microinstruction is dispatched by the reservation station to the AGU. Next, the linear address is generated by the AGU (processing block 1002). The STA microinstruction includes the information necessary for the AGU to generate the linear address. The AGU receives data in the form of a base address value, index value, displacement value, a scale value and a segment value which are added together to create the linear address. The AGU calculates the linear address in a manner well-known in the art. Once the linear address is calculated, it is stored in the store address buffer (SAB) (processing block 1003). A valid bit in the SAB may also be set, thereby indicating that the address is valid. The linear address is also sent to the TLB where the linear address is translated into a physical address (processing block 1004). The translation of the linear address into the physical address is accomplished in a manner well-known in the art. The translated (physical) address is stored in the SAB and the PAB (processing block 1005), thereby completing its execution.

The execution of the STA microinstruction is performed in a pipelined manner. In the currently preferred embodiment, the dispatching of the STA microinstruction occurs in a first cycle, followed by the linear address generation in the second, or next, cycle. In the second half of the second cycle, the linear address is stored in the SAB. In the third cycle, the linear address is translated by the TLB. In the second half of the fourth cycle, the translated (physical) address is written into the SAB and the PAB.

Referring to FIG. 10C, the STD execution begins with the dispatch of the STD microinstruction to the execution unit (processing block 1101). Once again, the STD microinstruction is dispatched by the reservation station. It should be noted that the data to be stored as a result of the execution of the STD microinstruction is data that is created or exists to some extent within the operating environment of the processor. Thus, the STD microinstruction is dispatched when that data is ready to be stored. In other words, the STD microinstruction is dispatched when the data to be stored has been created or is already present in the processor. The same relationship exists between the STA microinstruction and the micro-address of the store.

Once the STD microinstruction has been dispatched, the data may be converted into a memory format (processing block 1102). This conversion occurs when the data is in a floating point format. In this case, the data is converted into a floating point format with less precision that may be stored in memory. If the data is in integer format, then the data does not have to undergo any conversion. In one embodiment, the data is converted by the store converter. After the data is converted, (if necessary), then the data is written into the store data buffer (SDB) (processing block 1103) and the valid bit in the SAB is set (processing block 1104). Therefore, if the data is integer data, it goes directly into the SDB. The STD microinstruction is executed in a pipelined manner and the STD microinstruction is dispatched in a first clock cycle. In the first half of the next cycle, any conversion of the data by the store connector occurs. In the second half of the second cycle, the data is written into the SDB and the valid bit in the SAB is written, thereby indicating that the data in the SDB is valid.

The MOB 503 monitors the execution of the STD and STA microinstructions and determines when their respective data and address calculations have completed, so that the store operation may be completed or dispatched to memory. The MOB determines that the store operation is ready for completion by examining whether the address and data stored in the SAB and the SDB respectively are valid and whether the ROB 306 has committed these operations to processor state. The MOB determines the validity of the address and data stored in the SAB and SDB by examining the valid bits in the SAB. If the valid bit indicating that the address is valid and the valid bit indicating the SDB contains valid data corresponding to the address, then the MOB determines that the address and data information stored in the buffers is valid. The ROB indicates that the operations have been committed through the use of one or more signals sent to the MOB 503.

When the store is ready for dispatch to memory, the address and data are read out of their respective buffers, and the MOB dispatches them to the data cache memory. However, the MOB does not need to send the store to memory immediately upon determining that the address and data have been committed. The store is sent by the MOB at the convenience of the memory system. Both the SAB, PAB and the SDB have multiple entries for storing the address and data for multiple STA and STD operations, all of which might be at some stage of execution in the processor. There is a one-to-one correspondence between the entries in the SAB and the entries in the SDB. In order to maintain a correlation between a particular STA microinstruction and its corresponding STD microinstruction, each set of STA and STD microinstructions is assigned an identification (ID), referred to as a store buffer ID (SBID). Each SBID corresponds to one entry in both the SAB and the SDB. Since there are twelve locations in each of the SAB and the SDB, each entry corresponds to one of twelve separate SBIDs.

A SBID is assigned to each set of STA and STD microinstructions. This assignment occurs during the decoding and allocation (pipestage 10(c) of the store instruction, as part of the resource allocation. The STA and STD operations are tagged with the SBID. The instruction fetch and issue unit allocates the next available SBID. Since only twelve buffer locations exist, the allocator is able to enable a "wrap-around" effect by reallocating SBID from the top of the buffer (entry no. 1) after the SBID for the bottom (entry no. 12) has already been allocated. Once a SBID has been appended to the STA and STD microinstructions, the microinstructions are executed in two separate operations. A combining buffer (e.g., the SAB) monitors the execution of the STA and STD microinstructions and when the address and data are available, the store operation is dispatched to the data cache memory by the MOB indicating the specific entry in the SAB and SDB using the SBID. This includes having the address output from the PAB. It is appreciated that only retired store instructions are allowed to complete.

The present invention identifies for all operations that depend on a particular store operation. All loads that are issued subsequent to a particular store operation are tagged with the SBID of the store operation. By tagging all of the loads, as well as the store, the MOB is able to maintain any dependencies between store operations and load operations. In other words, the MOB tracks which store operations were issued before specific load instructions by examining the tags assigned to each of the operations. When a store address is written into the SAB, the address is marked valid. The address is marked valid by setting a valid bit associated with the entry of the address. As such, entries are sequentially allocated.

The SBID may also be used to detect for address collisions between store operations and subsequently load operations. By precalculating the address, some of the dependencies between load operations and store operations may be identified. The address of a store operation, through the STA microinstruction, may be calculated early so that a determination can be made as to whether subsequently issued load operations are to the same address. If they are, then they can be stalled until the store has completed execution. In this manner, the present invention ensures that a subsequent issued load operation loads the correct, or most recent, data.

The MOB 503 determines if there is an address collision. If those two addresses collide, thereby indicating that there is an access to the same location, then the data is significant because the data can satisfy the load operation. If the addresses are different, the load operation is independent of the stores in the SAB, and does not need to be stalled. The MOB is able to cause the operation to be aborted using signal(s) and buffer the operations until the conflict no longer exists. At that time, the MOB 503 causes the operations to be redispatched. Therefore, the address is computed early to try to manage that dependency, irrespective of the data that is involved. This delay is reduced and allows the resources executing the load operations to continue where there is no dependency.

PART IV—LOAD BUFFER

The process and mechanism for performing load operations is now discussed. Load operations are performed in response to load instructions executed in the computer system. The load instructions are received and executed by a processor in the computer system. In performing the load operations, the present invention insures that there are no memory ordering violations, even though these operations may be performed out-of-order. Resources (entries) of the load buffer are deallocated at retirement.

Figure 11:
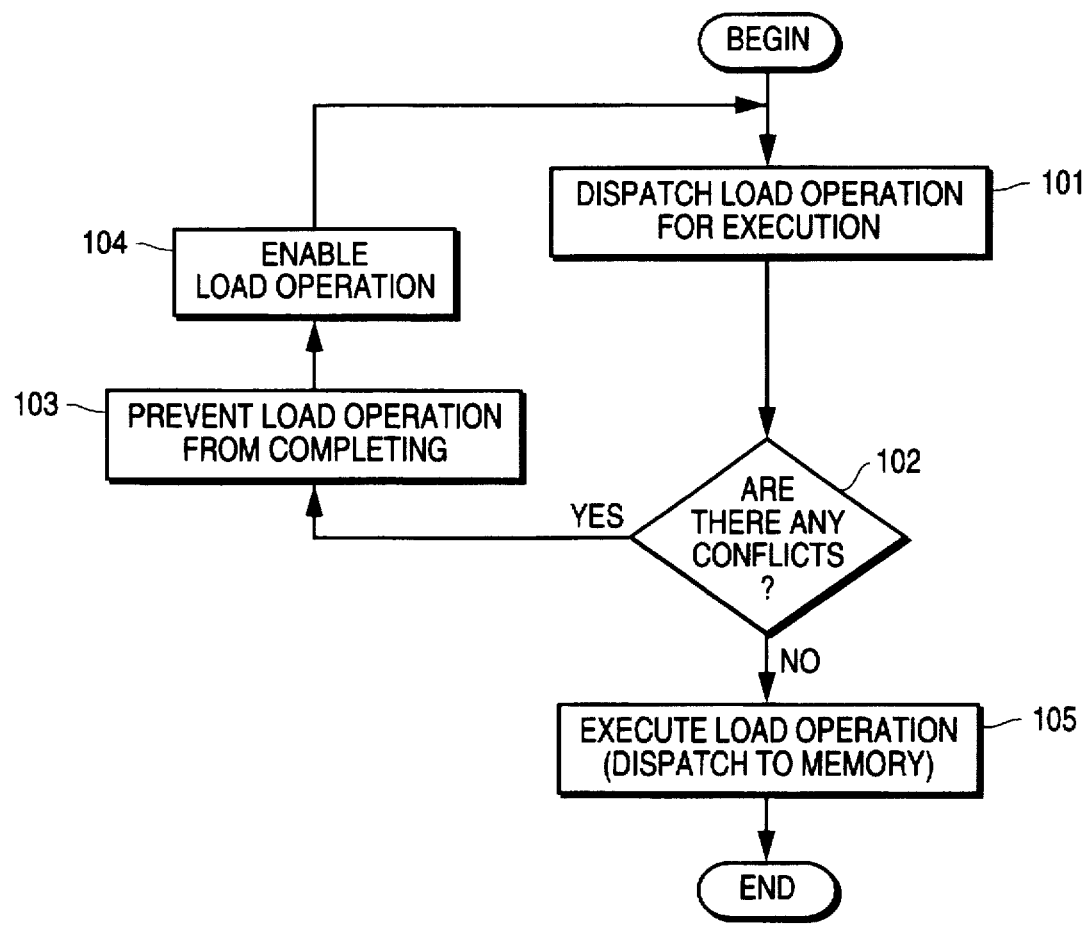
FIG. 11 is a flow diagram illustrating the present invention load instruction process.

The process for performing a load operation in the present invention is depicted in the flow diagram of FIG. 11. The load operation is allocated to the load buffer and is initially dispatched (at pipestage 10(e) of FIG. 1) from the reservation station 305 and into the memory subsystem for execution over the computer system (processing block 101). This dispatch occurs when there are no data dependencies on the load. A test then determines whether there are any conflicts (other than data depending conflicts) that might exist between the load operation and previously dispatched store operations which could possibly result in incorrect data being loaded into the processor as a result of the execution of the load (processing block 102). Several mechanisms are provided for detecting when conflicts arise, such that speculative execution may be used as much as possible. These conflicts may be due to address dependencies where the source address of the load operation may be the same as a destination address of one of the currently dispatched, yet not completed, store operations. Address dependencies are tracked between load and store operations by assigning an identification to each load operation to identify its relative temporal position with respect to the sequential stream of store operations. Using the identification, the a set of store operations is identified, if any, that potentially conflict with the load operation. The present invention also identifies conflicts due to resource dependencies. Resource dependencies exist when a resource required for execution of the load operation is currently in use or unavailable for one of a number of reasons, such that the load operation cannot gain control of the resource for its execution.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data (e.g., the load operation is performed within the computer system). At retirement of the load instruction, the load buffer deallocates the entry assigned to the retired load instruction.

The present invention also provides a process for performing load operations wherein multiple requests for the same cache line are satisfied with the first of such requests being sent to memory while the other requests receive their desired data upon its return in response to the performance of the first operation.

Figure 12:
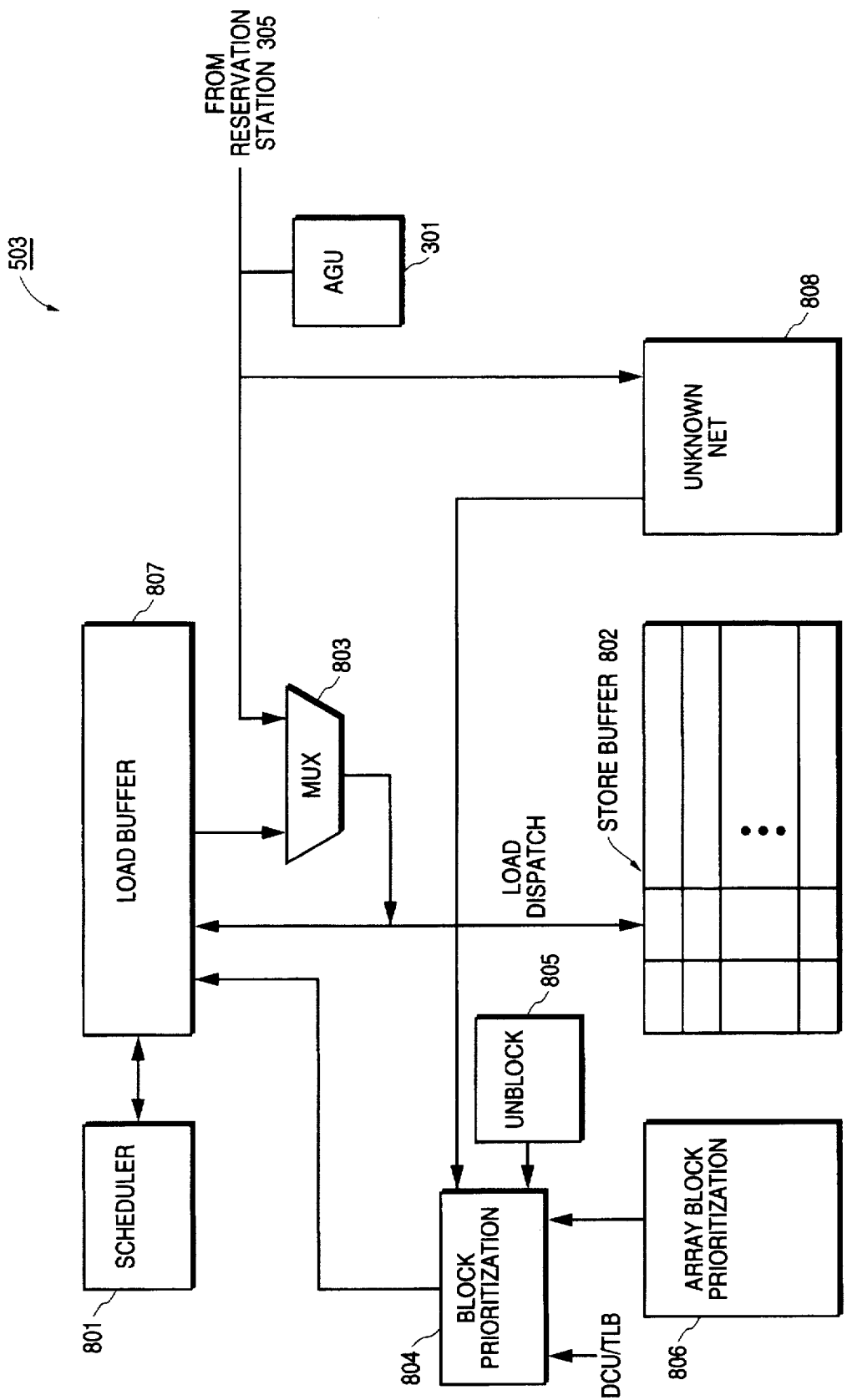
FIG. 12 is a block diagram of the relevant portions of the memory order system of the present invention.

FIG. 12 is a block diagram of one embodiment of the relevant portions of the memory order buffer (MOB 503). The MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched. LB 807 also is coupled to receive a copy of the load operations dispatched form the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

Performing Load Operations

In the present invention, a load operation is performed in response to a load instruction. The load instruction is received by the instruction fetch and issue unit which decodes the load instruction. An entry in the load buffer 807 is allocated sequentially to the load instruction. The issue and fetch unit sends the decoded load operation to the reservation station for dispatch to the memory subsystem when any data dependencies between the load operation and other instructions are resolved.

Once in the memory subsystem, the linear address for the load can be either bypassed directly from the AGU or can come from the MOB load buffer. The upper 20 bits of the linear address are translated by the DTLB into a physical address. The data cache memory uses these physical address bits along with the lower 12 bits of the untranslated address to do a tag array look-up and data array read (if needed). If the load hits the cache memory, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory, a request for data will be made to the bus controller. After the data is retrieved by the bus controller, either from an L2 cache memory or external memory, the data cache memory requests a cycle on the writeback bus to return the requested data. When the data cache memory has received a grant for a cycle or the writeback bus, it forwards its data to the load converter which drives it on the writeback bus after format conversion.

When performing load operations in the present invention, the load operation is dispatched for execution to the memory subsystem. Once a load operation has been dispatched, the data cache memory and the DTLB also begin providing a blocking status, while the MOB detects one or more address conflicts. Using the blocking status condition and the address conflict information, the MOB prioritizes the conditions and conflicts to determine if the load operation should be allowed to continue in execution. If the load cannot be completed due to a conflict, it is halted, or blocked. That is, the DCU aborts the load request. In this case, the MOB 503 creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle. The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load currently executing in the system. When the appropriate data is returned, the load operation will wake up and be redispatched. Once redispatched, the load may block again, or complete with returned data.

The load operations that are blocked are stored in the load buffer 807. The load buffer contains sixteen entries in one embodiment. Therefore, at most 16 load operations can be pending in the processor at any one time. As many as 16 load operations may "wake up" in a given cycle. Since only one load is dispatched every cycle (in the preferred embodiment), the MOB must queue the load operations that are awake for dispatch. Queuing is performed by the load buffer 807 by tagging loads as "ready" when they wake up. The load buffer then schedules for dispatch one of the "ready" loads each cycle. This ready/schedule mechanism allows the throughput of one load scheduled per cycle.

The memory of the system is organized such that it receives the loads dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be block no longer exist. At this time, the load is allowed to redispatch.

Figure 13:
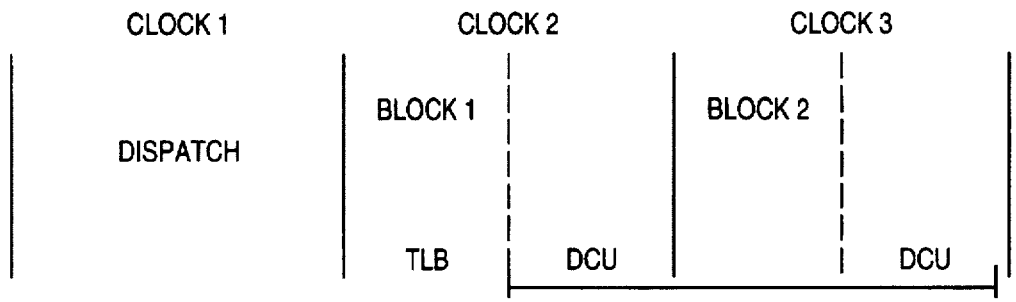
FIG. 13 is a timing diagram of the execution of a present invention load operation.

The memory execution model is a three stage pipeline. The pipeline is shown in FIG. 13. A load operation enters the execution pipeline in the first clock cycle when it is dispatched by the reservation station. In the second cycle of the execution pipeline, some blocking checks (BLOCK1) are performed as well as the TLB access. In performing its access, the TLB supplies information to the data cache memory and the data cache memory begins its memory cache lookup. In the third cycle, the remainder of the blocking checks (BLOCK2) are completed. The blocking checks from the second cycle are grouped into one set with the blocking checks performed in the third cycle to produce status bits that indicate whether the load is to be blocked. Also in the third cycle, the access to the data cache memory is completed.

Specifically, with respect to the second clock cycle, the TLB performs the linear address to physical address translation in the first half of the second cycle in a manner well-known in the art. The translation operation performed by the TLB will not be described further in detail. In addition to returning the physical address, the TLB returns status information based on the TLB translation (e.g., translation performed correctly) and the memory type. The TLB indicates that the translation resulted in a fault, a page miss, a blocking condition or a valid linear address (e.g., translation performed correctly). The fault and miss indications are well known to those in the art and are not to be described in further detail herein. If the address cannot be translated, then a blocked status is generated by the TLB. For instance, in the present invention, a page miss may occur where the page mishandler is busy. In this case, the load operation must be halted, or blocked. Another example occurs when there is a linear address miss and a replacement in the TLB at the same time. Here, a blocked status is produced for the load operation. The specific conditions causing the TLB to generate a blocked status are dependent on the implementation of the paging system.

The memory type is also returned during the second cycle, along with the physical address. The different memory types include: normal cache speculative memory, uncacheable memory, non-speculative memory (e.g. memory mapped I/O). The speculative nature of the memory type depends on whether accesses to that location may be performed out-of-order. If so, then that location is speculative, while if not, then the location is non-speculative, such as in the case of a direct mapped I/O location. The different memory types are ascertained from a set of registers in the PMH that contain the memory type which are located according to the physical memory space as determined using the physical page address. The memory type for the load is stored in the TLB.

In addition to the physical address, memory type and the TLB status, other signals are generated during the second cycle and received by the MOB. For instance, a MOB block signal is generated indicating that an address dependency exists. A linear address calculation fault indication signal is generated by the AGU and received by the MOB as well. The linear address calculation fault is generated as a result of a segment violation or other bus or dependent exception that indicates the linear address is invalid and has a fault.

Also during the second cycle, the data cache memory begins its access using the lower bits of the linear address. The bits utilized are that portion of the address that does not undergo the TLB translation. The remainder of the physical address is received fairly early from the TLB. The cache memory access continues into the third cycle. If a cache miss occurs, then potentially one of these two conditions may exist: a block or a squash. A block occurs, referred herein as a data cache memory block, when the cache memory is unable to buffer the load operation and blocks its completion. This is due to multiple memory operations already pending completion on the system bus. A data cache memory block condition may also be asserted for several other reasons. For instance, if there is a pending snoop to the cache line that is already being accessed at that time, then a data cache memory block condition exists. A squash, herein referred to as data cache memory squash, occurs if there is already an access to the same cache line. This provides a performance gain since a second bus request or buffer (e.g., queue 603 in FIG. 7) does not have to be allocated.

Also, in the third cycle, the MOB receives all the blocking information status signals and combines them to produce a load status. Also during the third cycle, the data cache memory completes its access and sends data to the load converter for its final conversion and writeback unless there is an earlier block or fault signal that aborts the cache memory access.

The status of the load operation is written into the load buffer. The load status may be one of four designations: invalid, valid and completed, valid and blocked, or valid and not blocked. Each load gets written into its load buffer with the status and the load buffer uses these status bits to determine when the load operation is to execute in subsequent cycles. If there are no blocks or faults or other similar associated conditions/conflicts, then the load operation is sent to the data cache memory and assigned a load status of valid and completed. This does not necessarily mean that the load operation has been executed. With respect to writing back to the reservation station and ROB, the load operation has not completed (e.g., because there may have been a cache miss). From the MOB's standpoint, however, it is completed and no further action needs to be taken by the MOB. If a fault occurs with respect to the load operation, it is marked as valid and completed. Note that these faults may be indicated by the TLB or an AGU. The load may not have actually happened, but as far as the MOB is concerned the operation has been completed. If a page miss occurs with respect to the load operation, then the load operation is marked invalid. In the case of a page miss, the page miss handler processes the page a page walk and redispatches the load.

The valid and blocked and the valid and not blocked status are a function of multiple conditions and conflict determinations. The MOB, TLB and data cache memory provide the information to determine whether or not the status should be blocked or not. These different conditions are prioritized to allow a general information field for determining when to redispatch a load operation.

Load Execution and Blocking Conditions

In the present invention, the block conditions are based on address dependencies and resource dependencies. The present invention determines whether there are any possible address dependencies that may prevent the load operation from executing out-of-order. The results of the determination are combined to generate one or more MOB block signals that indicate whether a conflict exists between the load operation and another store operation and, if so, which store operation presents the conflict. The present invention determines resources conflicts by examining the data cache memory to determine if the data cache can accommodate the load operation and/or whether there is a read of the same cache line currently taking place in the cache memory. The present invention also determines if resource conflicts by examining the PMH and the TLB. The present invention also determines whether there is a linear address calculation fault. Using this information, the present invention is able to determine if the load status should be blocked or not.

Address Dependencies and the MOB Block Signals

The present invention begins determining if an address dependency exists through the use of store coloring. The present invention performs store coloring to track dependencies between load and store operations. Store coloring is performed by the issue and fetch unit 201 when an instruction is being issued. A store buffer identification (SBID) is assigned (tagged) to each load operation during decoding. The SBID includes five bits (including a wrap bit). The SBID points to the entry in the store buffer where the most recent store operation remains until it writes to memory. Store buffer entries are allocated sequentially to the store operations as they are issued. Each memory load operation is tagged with the SBID of the most recent store operation. Thus, the SBID assigned to the load operation defines the youngest store operation that is older than the load operation itself. By knowing which store operations are older than which load operations, possible dependencies may be identified. By identifying the dependencies or a lack thereof, the present invention is able to determine when each of the loads may be executed. More particularly, the present invention uses the relative temporal location of the load operations with respect to the store operations to determine whether subsequently issued load operations may execute before prior issued store operations.

In store coloring, each store operation is written into a distinctive entry of the store buffer 802. As the store buffer has a limited number of entries, as discussed, the buffer includes an additional bit, referred to as a wraparound bit, which indicates whether the buffer is implementing a wraparound feature. After the last store buffer entry is allocated, the present invention continues allocation from the top of the buffer, thereby effectively wrapping around the end of the buffer. The wraparound is used for two reasons: to detect the empty versus full condition and to tell whether the load operation is pointing to a store operation that is already dispatched versus a store which is gone into lower entry in the buffer yet is really younger.

The store buffer includes a pointer, referred herein as the tail pointer, which points to the oldest store in the machine. The stores in the store buffer are allocated in the order of their dispatch from the reservation station in order, but not necessarily dispatched in their original program order. However, they are usually in order, if not very close, because they do not have the dependencies that would generally delay them in the reservation station. When a load is dispatched, the store color of the load operation points to a particular entry in the store buffer.

During the first cycle of dispatch, using the store color of the load operation, the present invention determines if the store buffer has any invalid store addresses that are older than the load operation. In the present invention, this determination is made by checking STA entries in the buffer (where each STA is a operation that produces the destination address of a store). Since load operations cannot pass store operations with unknown addresses, the present invention uses this check to block the load operation until the STA has been dispatched from the reservation station, i.e. until the address has been calculated. To determine if the store operation is older, the present invention uses address detection to search the store buffer from the tail pointer (oldest store in the store buffer) to the store operation pointed to by the SBID assigned to the load operation. This region will hereinafter be referred to as the tail region. If an entry has an invalid address, then a signal (e.g., a bit) is asserted with that SBID. This signal (e.g., a bit) produces an signal, referred herein as the unknown net signal, which is a logical 0 when the address is not valid and a logical 1 when it is. If the address is not valid, the load operation is tagged with the SBID of the store operation having the invalid address, preventing the load from dispatching until that STA has been dispatched from the reservation station. If more than one entry in the tail region of the store buffer has an invalid address, it is the SBID of the closest STA in the tail region to the tail pointer of the store address buffer.

Figure 14:
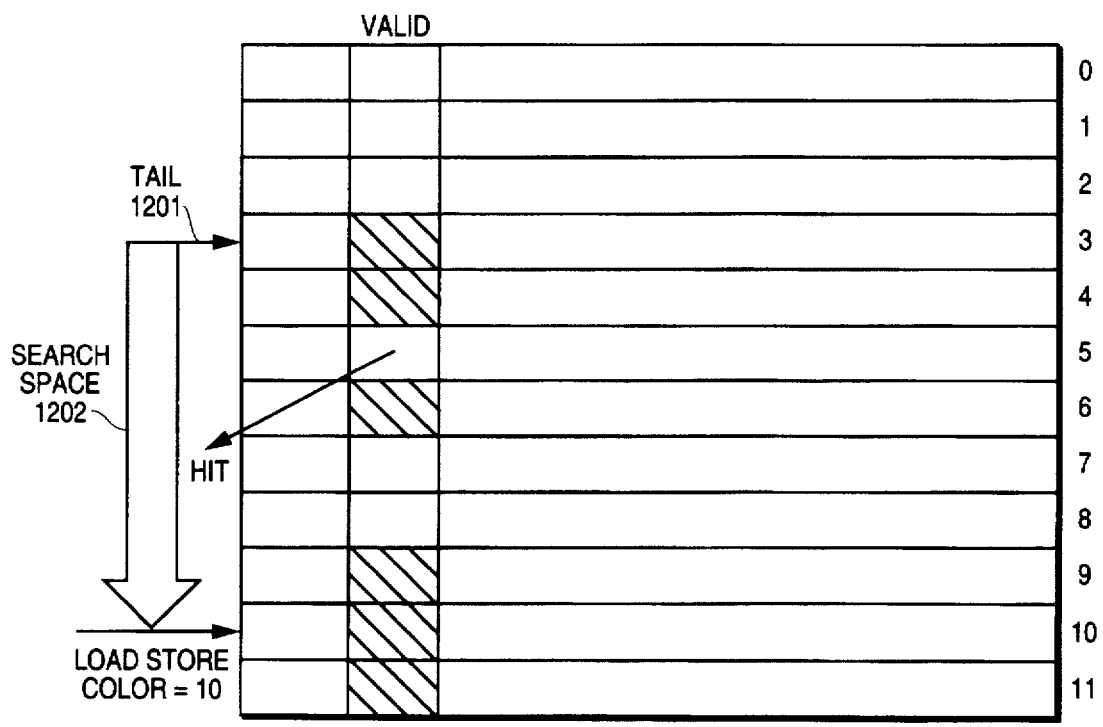
FIG. 14 illustrates the store address buffer and the tail pointer of the store buffer of the present invention.

FIG. 14 illustrates an example of the store buffer entries taking part in the unknown net check. The tail pointer 1201 of the store address buffer is at entry 3, and the store buffer contains valid STA operations in entries 3, 4, 6, 9, 10 and 11, indicated by the shaded valid entry locations. (Note in the present invention the validity of an entry may be marked by a logical 1 or logical 0 being stored in a buffer location corresponding to the particular entry.) A load operation with a store color of 10 is dispatched from the reservation station. The tail starts at entry 3, and searched downward, ending at entry 10, the loads store color. The first STA operation that is invalid is 5, and that is the SBID that is returned. This check for invalid store buffer addresses only occurs once, at that time of dispatch from the reservation station. As will be described below, the remaining block and conflict checks are performed each time the operation dispatches to the memory system, such that a load may be blocked and redispatched basically going through the pipe stages repeatedly before being allowed to execute.

Once the store color has been identified, then the store operations starting from the store operation having the same SBID to the oldest unexecuted store in the store buffer, marked by the tail pointer, are checked to determine whether there should be potential load blocking. These checks occur in the second cycle of execution. During the second pipeline stage, a check is performed between the lower address bits 11:3 of the address of the load with bits 11:3 of the store addresses within the tail region (labeled search space 1202) from the store buffer entry having the same store color and the tail pointer 1201. This check creates an array block by determining the latest store operation that may pose a potential conflict. The result of this check is the generation of an array block indication signal. If the check determines an all blocking description, then the array block indication signal is asserted during this second condition check.

An array block indication signal is also asserted if there is a linear address match and an overlapping access. That is, if bits 11:3 of the load does not equal bits 11:3 of the stores, but there is an overlapping access. In this case, the array block indication signal is asserted. All of the array block conditions are qualified by a block enable. In this case, the array block signal is asserted if:

| Address Valid = 0 | OR | | |
|---|---|---|---|
| (Block Enable = 1 | AND | All block = 1) OR | |
| (Block Enable = 1 | AND | Linear Address Matches = 1 AND | Overlapping |
| Access) OR | | | |
| (Block Enable = 1 | AND Split Store Address Match). | | | there is a conflict, then the signal is at a logical 1, while if there is no potential conflict, the signal is at a logical 0.

The array block signal may be asserted for each of the entries in the store buffer in response to either one of four separate conditions or address conflicts. All entries independently determine if they have a block condition against the load. The blocks of the entries are then prioritized starting with the store color of the load operation and ending with the tail pointer of the store address buffer. Only stores older than the load are considered and the youngest blocking store older than the load causes the array block (e.g., the other direction of the unknown net check).

First, the array block signal is asserted when an invalid address is contained in the store buffer entry. If the entry in the store buffer does not have a valid linear address (and a valid STA instruction), then the array block signal is asserted. The array block indication signal is asserted because it is assumed that the addresses conflict. The array block signal for an entry in the store buffer may also be asserted if bits 11:3 of the load operation match the same bits in the address of the store. Since these bits represent the same for both the linear and physical addresses, there is a possibility that the load and store are to the same address. Therefore, in this case, the array block indication is asserted.

An array block condition also exists if the load address minus 32 matches the stores address with respect to bits 11:3 and the store operation is a split access. The split access exists when the store operation spans two cache lines. This is referred to as a cache line split. In the preferred embodiment, since each cache line is 32 bytes, a cache line split is an access that crosses a 256-bit boundary. A split access also occurs when the store access crosses two 64 bit boundary. When stores are split, the store entries are marked with a tag to identify them as split accesses.

The array block indication signal is also asserted for stores that are all blocking. Stores that are all blocking block all loads irrespective of the type of load. For example, if the store is to memory mapped I/O, then the store might actually write to memory, thereby changing the configuration of your memory. In this case any load that would be allowed to execute out of order may potentially cause incorrect data to be returned from memory. Another category of all blocking store operations include fence operations which are used to synchronize the operation of the processor. A store address fence operation stops all memory access and retires everything up to the store fence. The fence operation prevents all loads from dispatching until it has been dispatched and has completed execution. If the entry in the store buffer contains The information required to perform the array block check is stored in each entry of the store buffer. The store buffer includes storage locations for a valid bit, a block enable bit, and all block bit, address information and a split bit. These bit locations provide status for each entry. Note that the information is written into the store buffer at STA dispatch, at which time the MOB writes the information into the buffer.

With respect to the block enable bit, if the store operation faults, its blocking enable is turned off (e.g., set to a logical 0). If a fault occurs, the linear address cannot be guaranteed accurate. Thus, the entry is not allowed to participate in blocking. This does not adversely influence the processor since all the information sequentially following the fault will be purged anyway. In another embodiment, all stores in the store buffer may participate in the store blocking. The result of the array block condition detection is a valid store buffer ID of the most significant entry (i.e., the youngest) that causes a blocking condition on the load between the store color of the load and the tail pointer of the SAB. Also during the second cycle, a third check is performed to determine if another blocking condition, referred to as unconditional block, exists. The unconditional blocking detection occurs in parallel with the array block detection. The unconditional block check is based on the load, as opposed to being based on the store as with the array block check.

If the load is a split access and is being dispatched speculatively, then an unconditional block exists and the load is blocked. The MOB 503 determines and signals is a dispatch is speculative. Note that the present invention does not handle split access cases for a load due to the amount of address comparison that is required. If the load is a split access, twice as much address comparison is required for processor ordering. In certain embodiments, the performing of split accesses need not be considered criteria for blocking.

An unconditional block is also signaled if the load is a split access and one or more store operations are temporally in front of the load in the instruction stream, i.e. a split access requires all prior stores to be executed. Furthermore, if the memory type of the load is unspeculable and it is being dispatched speculatively, then the load is unconditionally blocked. Lastly, the present invention detects an unconditional block condition if the memory type of the load is nonspeculative and there are one or more stores which precede it. This determination is also made in the second cycle of the load execution pipeline with the determination of whether a tail hit condition exists. The tail hit condition exists when the store color of the load incremented by one is equal to the tail of the store. In other words, if the tail of the store is in the immediately following entry in the store buffer, then the tail hit condition is satisfied. In this case, there is nothing in front of the store. Also, if the load store color equals the tail of the store and the store is deallocated, then the tail hit condition is satisfied. This deallocation occurs when the tail is at a particular location in the store buffer but is in the process of moving to another position. In the preferred embodiment, a tail hit indication signal is set to a logical 0 to indicate that stores in the front; otherwise, it is a logical 1. Thus, the unconditional block requires that the load be redispatched when it is ready to be committed to permanent architectural state and all prior stores have already been committed.

The memory type is determined by the PMH and the TLB during the same cycle and is validated only if the page is translated. In the present invention, the term unspeculable indicates that there are no older stores in front of it in the execution stream that have not been committed to permanent architectural state. The present invention uses a signal indicating whether the dispatch is speculative or non-speculative. An indication is given by the MOB indicating whether or not the load is at retirement. If the load is at retirement, then the first and third conditions of unconditional block detection do not exist and only the second and fourth conditions are possible. Detection of a split access is well-known in the art. The determination of the memory type being unspeculable comes from the TLB, while by determining if the tail pointer is past the store color of the load. If so, then there are no earlier stores.

When the unconditional and array block conditions have been checked, the address validated, and tail hit calculation accomplished, the information is combined to produce one or more MOB block signals. In one embodiment, a single MOB block signal is set to a logical 1 if the unconditional block detection is true, or the array block condition is true and the tail hit equals zero, or if the unknown net indication signal is a logical 1 (true) and the load is passed directly from RS dispatch to the memory subsystem for execution without being written into the MOB. If the tail hit equals 1, then these are stores valid because the stores being checked are don't cares. Thus, using the unconditional block detection, the unknown net detection, the tail hit determination and array block detection, the present invention generates the MOB block signals. When MOB signals are asserted, the load is blocked and the data cache memory and the TLB abort the access.

Speculative strong ordering applies to situations when a load buffer contains a load operation to a given address and that given address is seen over the external bus 211 (associated with a write instruction) of the computer system of the present invention. This may be due to another processor coupled to bus 211. If the given address is seen over the external bus between the time the load instruction was dispatched but before it retires, then to insure data integrity, the load instruction is ignored and all current speculative instructions are purged from the processor and the processor starts processing instructions in program code order until the load instruction retires. Speculative strong ordering is another load blocking situation.

Resource Dependencies

During dispatch of the load, the DTLB and data cache memory return resource blocking information. In the present invention, a load is "squashed" by the data cache memory if the load is trying to access a cache line that is already outstanding in the data cache memory (e.g., an access to a cache line that is pending). The data cache memory already processing a cache miss to the same cache line as the load. In this case, the data cache memory blocks the load instead of making a duplicate bus request for the same cache line and asserts a DCSQ signal.

A load is blocked by the data cache memory when the data cache memory cannot complete the load due to resource or ordering conflicts other than a squash. For instance, a load that misses is blocked by the data cache memory when the buffers in the data cache memory (e.g., buffers 603) are full, such that a cache miss cannot be processed. Also, if there is a pending snoop occurs to the load's address inside the data cache memory. The load may be blocked by the DTLB. This occurs when the load has page missed, and the PMH is walking the page tables for a different operation. In the preferred embodiment, the PMH only handles one page at a time. In response, the DTLB asserts a DTLB block signal. The DTLB also asserts the DTLB block signal for other conditions, such as when a load and STA simultaneously page miss, and the STA page walk has priority (i.e., the PMH handles the STA first).

For any load dispatched, the data cache memory and DTLB may assert blocking status, and the MOB may detect one or more address conflicts. If a blocking condition exists, the data cache memory aborts the cache access.

Block Code Generation and Prioritization

The MOB is responsible for prioritizing the blocking conditions and creating a block code that identifies the event that must happen before the load can redispatch. Blocking conditions are prioritized with the DTLB Block having the highest priority. The next highest priority is the MOB signal including the unconditional block detection and the array block. The blocking codes are listed below:

| \multicolumn{4}{c}{Block Codes} | | | |
|---|---|---|---|
| CODE | TYPE | DESCRIPTION | USE ID? |
| 000 | NONE | The load has no block condition | No |
| 001 | STA | The load is blocked pending a STA dispatch (because a store previous to the board has an invalid store address) | Yes |
| 010 | STD | The load is blocked pending a STD dispatch (where a store previous to the load has a data conflict with the load) | Yes |
| 011 | STORE | The load is blocked pending a MOB store dispatch and deallocation | Yes |
| 100 | DCU_SQ | The load is blocked pending a data cache memory buffer (603) write | Yes |
| 101 | DCU_BLK | The load is blocked pending a data cache memory response | No |
| 110 | RETR | The load is blocked until retirement (due to its opcode memory type, or alignment) | No |
| 111 | DTLB | The load is blocked pending PMH resources | No |

The block information is prioritized to produce a block code. The block codes are NONE, store address (STA), store data (STD), data cache squash (DCSQ), data cache block (DCBLK), DTLB block (DTLBBLK) or retirement (RETR). Using the four blocking signals plus the other status produces one of the eight block codes. When a load is dispatched again, block information is generated again to produce a new status. In the present invention, a load may actually block, redispatch and block again for the same reason or a different reason. The prioritization is performed in an attempt to monotonically decrease the chance of a subsequent block.

The block codes are assigned after the array blocking determination. If a MOB block condition exists, the blocked load may be saved until all the earlier stores are performed. However, this has an adverse effect on the execution performance. During the second cycle, an operation is performed to further classify the block codes for loads blocked due to address dependencies. This operation is a comparison of the load to the store that had an array block. This calculation allows the present invention to determine if the accesses are to the same location, such that data could potentially be forwarded from the store that is pending. Initially, a full linear address match is performed between the address of the load and store operations. In one embodiment, only 32-bits of the two addresses are compared. If the address of the load and the store are equal and valid and the data for the store is available and the load's data size is less than the store's data size, then a store forward operation exists. In this case, the data that is to be stored may be accessed to supply the load operation. This data can be read out of the store buffer and sent back to complete the load operation. The store data is forward to the load instead of the data cache memory's data and the load is satisfied. The load is marked complete and is done.

If the full addresses are equal and valid but the data is not available for the store, the load is blocked with the STD block code. Thus, the STD block codes indicates that address and subsequent access are suitable for forwarding data to the load, but the STD operation of the store operation (i.e., the data calculation sub-operation of the store) has not been dispatched from the reservation station 305. The load is blocked until the reservation dispatches the STD for execution. Once the STD occurs, the load in the load buffer can become unblocked (i.e., it can wake up) and be forwarded to the data from the STD operation. The determination as to whether the data is valid is done by examining the data valid bit in the store address buffer. If the address is not valid, then a STA block code is assigned. The STA block indicates that a block on the STA operation that is yet to be dispatched from the reservation station. When it does dispatch from the reservation station, the blocking condition will be removed.

If the address is overlapped but not completely, such that the load data size is greater than the store data size, then a STORE block code is assigned. This STORE block condition occurs when the store address has been translated but the data cannot be obtained from the cache memory or the store buffer because neither contains all the data that is desired. Hardware may be included in the computer system to receive the data from both the data cache memory and the store buffer of them and combine them. Such hardware could be implemented into a processor. In the alternative, the load is blocked until that store is dispatched to memory. The store's execution is only dependent on the data retiring into the memory subsystem or the address being resolved unconditional block on a non-speculative load with a tail hit.

If the data cache memory squash indication or the data cache memory block is asserted and none of the others are asserted, then the block code and the data cache memory block (DCBLK) code are generated respectively. The RETR will be generated if there is an unconditional block and there if no TLB block. A DTLB block may be generated is the TLB produces a block.

A block code of NONE is generated when a load is dispatched yet its writeback to the ROB is canceled. A block code of NONE is assigned when an unknown net is detected on the operation that is bypassed. If the writeback is canceled and the reservation station does not anticipate data for this load and will not try to schedule their operation. Normally, the load dispatched during this cycle would expect a writeback. Then, data dependent operations would be dispatched later. The reservation station of the present invention dispatches load operations such that there is only an effective one clock latency. However, if it is known that the load will not complete, then the ready scheduling is canceled. This cancellation must be early enough to prevent the ready scheduling prior to dispatch.

Each of the eight block codes is encoded with a bit code. When a block is determined, a block ID may also produced. The block ID allows the block codes to be qualified to prevent spurious wake-ups. For example, in the case of the store data block (STD) the store of interest has already been identified. Therefore, if any store data operations are as a wakeup, then many false wake-ups could occur. By appending the store buffer ID as the block ID, the MOB only watches for the particular STD as the flag condition. For the same reason, the STA and STORE block codes also include the SBID as a block ID. The STA and STORE block codes have IDs that are four bits, while the block ID for the STD is four bits. The DCSQ block code also includes a block ID. The block ID represents the chunk and the buffer (603) location corresponding to the pending load that squashed this load; this field is four bits in length.

Load Wake-up and Scheduling

To entry the memory subsystem, loads in the load buffer undergo a ready/schedule/dispatch mechanism. In each cycle, a load is marked "ready" if the load has no outstanding block conditions (e.g., received a wakeup). Then, one of the "ready" loads is scheduled, such that older loads dispatch before younger loads. Finally, the scheduled loads dispatch and execute as described previously. Loads may be blocked due to memory order constraints or resource limitations as described previously. Blocked loads are tagged with a block code and a wake-up ID. Each load buffer entry also includes a valid bit and a complete bit. If a load entry's valid bit is set and its complete bit is not set, then the load still needs to be dispatched to the memory subsystem. The MOB uses the block code to determine when the load can dispatch.

The load buffer snoops several sets of signals to detect wake-ups. Blocked loads compare wake-up signals against their block codes and IDs and can transition from valid and blocked to valid and ready if the block code matches a wake-up code.

A particular load buffer entry will wake-up according to its block code. In the case of a load having a block code of NONE, the load will always wake-up since the NONE block code is a don't care. In the case of a load with a RETR block code, the load only wakes up when the load reaches retirement. With a DTLB block code, there are various conditions that could force a DTLB block wake-up. Note that this is a normally the case since a majority of the DTLB blocks occur because the page mishandler is busy on a miss. In the case of a DCU block due to the buffers 603 being full, a single signal indicates that the buffers 603 are no longer full such that a load having a DCU block will be awakened. With respect to the DCU squash, a blocked load wakes up when a particular chunk of a particular fill buffer entry is returned to the processor. If the chunk and data cache buffer (603) designations match that of the returning data, a load having a DCSQ block code will wake up. All loads with a DCU squash block code will be awakened by the MOB after queue 603 has become empty. In one embodiment, all loads that are blocked may be awakened (unblocked) at the same time in response to a Broadcast Wakeup. This Broadcast Wakeup ensures that all loads eventually become unblocked at some point. This type of wakeup may be performed at predetermined times or at predetermined intervals of time.

The scheduler performs prioritization and produces a single bit indicating which of the woken-up loads is to be dispatched. Each entry is looking for that entry bit. If a load buffer entry receives the schedule bit, then it reads out of the array to the bus where it is potentially dispatched. It should be noted that it doesn't actually ensure that the load will be dispatched because there may be a higher priority memory operation that requires dispatching. Therefore, the load operation is read out of the array and if it is the first choice for dispatch by the MOB. If it does dispatch, then the entry is cleared. Once a load is dispatched from the load buffer, it is forgotten until it writes back. The writeback will occur with new status. It should be noted that it may be blocked again for other reasons.

Figure 15:
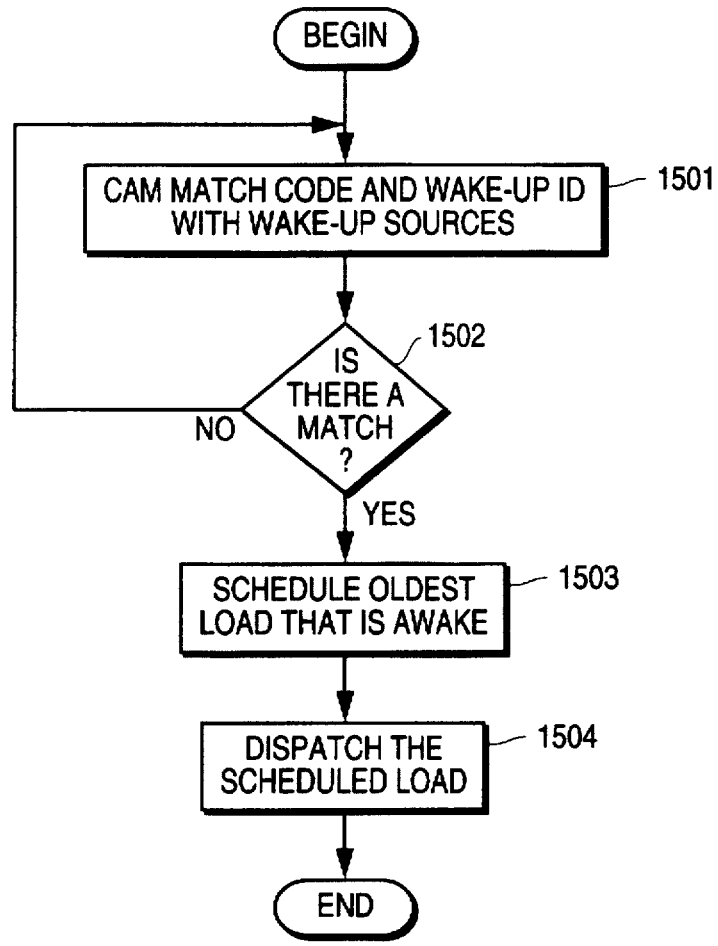
FIG. 15 is a flow diagram illustrating the wakeup, schedule and dispatch process for a load instruction.

The present invention may schedule the loads in numerous ways. For example, the scheduler could choose to schedule loads randomly. However, this does not ensure that the oldest stores will be chosen. In another embodiment, the scheduler can choose from the top of the load buffer to the bottom or vice versa. However, the choice of loads for execution would be biased based on the physical structure. FIG. 15 summarizes the wake-up, schedule and dispatch process.

Load Squashing

A load operation is squashed (e.g., blocked) by the data cache memory if the load is trying to access a cache line that is already outstanding in the data cache memory. As the data cache memory receives a stream of load operations, the data cache memory determines through well-known tag matching techniques whether the data is currently stored in the data cache memory. If the data is in the data cache memory, then the data is provided to complete the load operation. If the data is not in the data cache memory, then a cache miss results and a bus cycle is generated to obtain the data from an external source, such as a level two (L2) or higher order cache memory or the external main memory residing on the system bus.

Each load that is requesting data contained in a currently pending bus cycle is squashed. Numerous load operations may be squashed waiting for one particular pending load operation to complete. The data cache memory of the present invention is capable of having multiple load operations to external memory pending at the same time. In this case, if a load operation requests data that may be contained in the data of any of these pending load operations, then the load operation is squashed.

Timing Diagrams

Figure 16A:
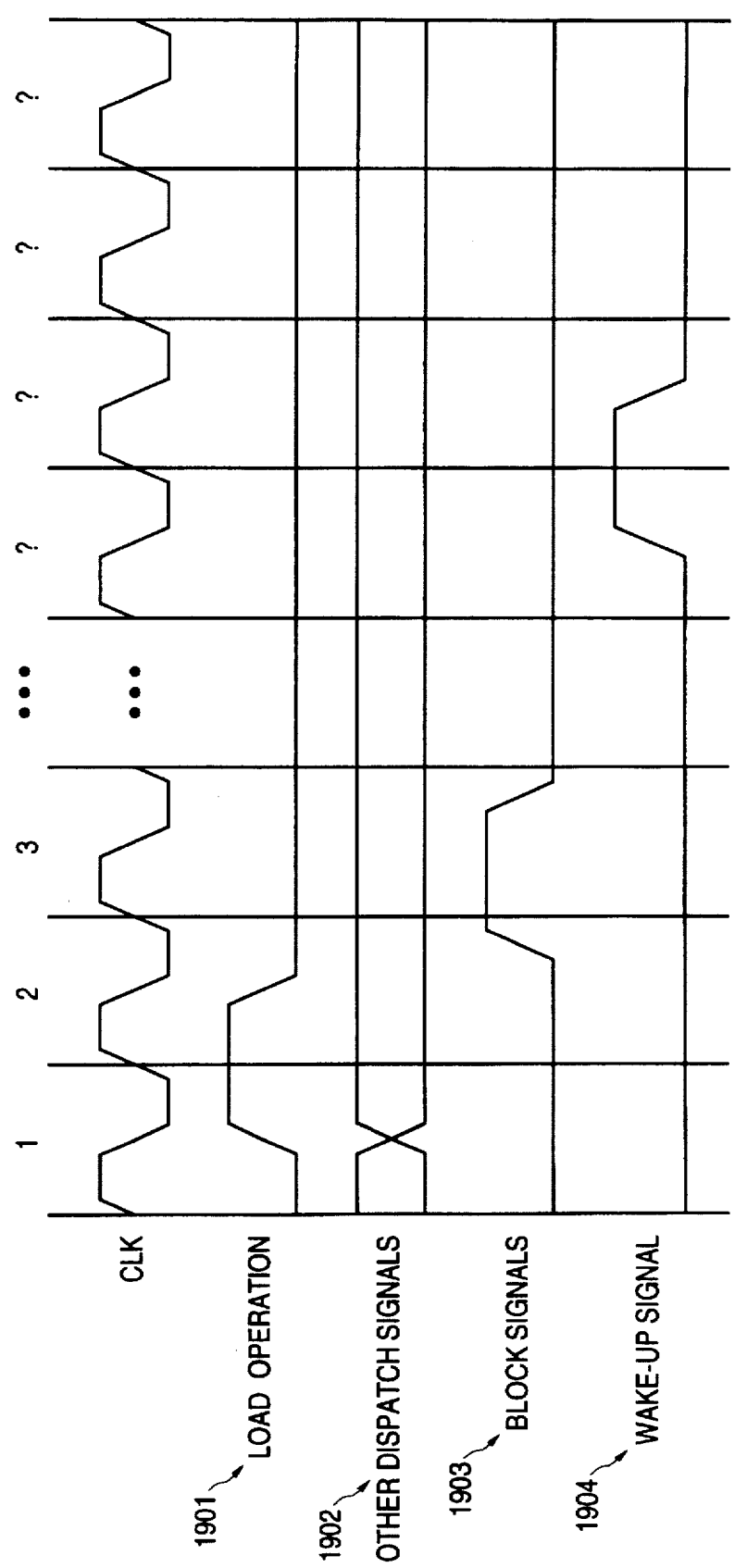
FIG. 16A is a timing diagram of the dispatch, block and wake-up timing for a load operation according to the present invention.

FIG. 16A is a timing diagram depicting the dispatch, block, and wake-up timing for a load operation. The load operation 1901 is dispatched into the memory subsystem during the first clock signal. Also during the first clock cycle, other dispatch signals 1902 are asserted (or unasserted) to facilitate the dispatching of the load operation. After conflict and condition checks have been completed, a single block signal 1903 is asserted at the end of the second cycle. Some clock cycles later after the condition or conflict has removed, a wake-up signal is asserted in the middle or a clock cycle. Note that in FIG. 16A, no IDs are involved.

Figure 16B:
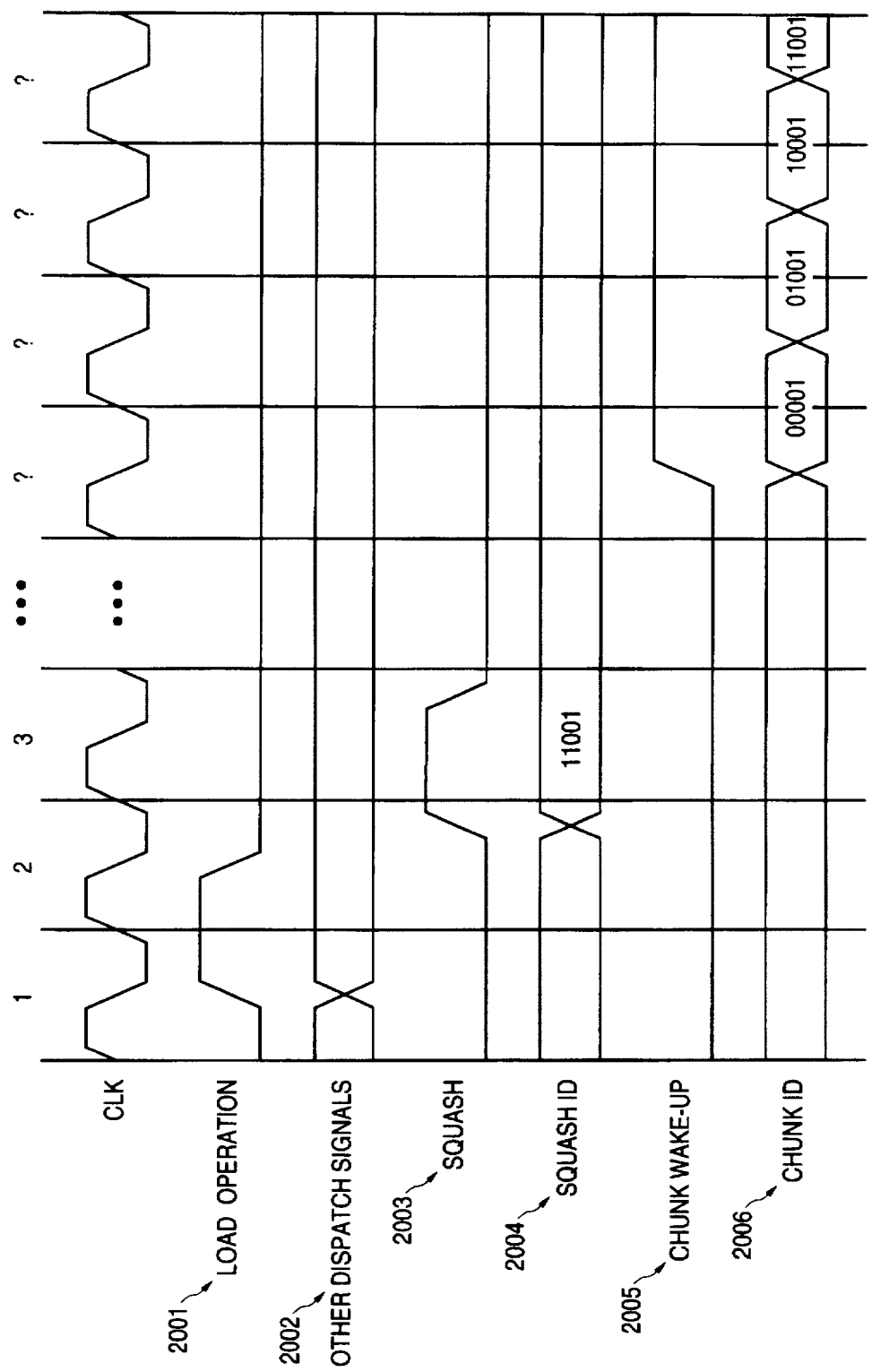
FIG. 16B is a timing diagram of the dispatch, squash, block and wake-up timing for a load operation according to the present invention.

FIG. 16B is a timing diagram depicting the dispatch, squash, block and wake-up timing and signals for a load operation. The type of squash is due to a load access which hits an entry in the queue 603 that has already been allocated for the same cache line but the required data has not yet returned from the bus controller. The load operation 2001 is dispatched during the first clock cycle, along with other dispatch signals 2002 being asserted/deasserted. At the end of the second cycle, the squash signal 2003 is asserted. At the same time, the squash ID 2004, indicating the queue 603 entry and desired chunk is sent. Some clock cycles later, the chunk wake-up signal 2005 is asserted. Note that the chunk wake-up signal 2005 is asserted for four cycles. The chunk ID 2006 for each of the four cycles is different. This kind of wake-up occurs when each chunk of data returns from the bus controller, or when a data return is schedule three cycles before the return of the data. A buffer wake-up signal has been omitted from FIG. 16B and is asserted when the read complete for the buffer returns from the bus controller.

Figure 16C:
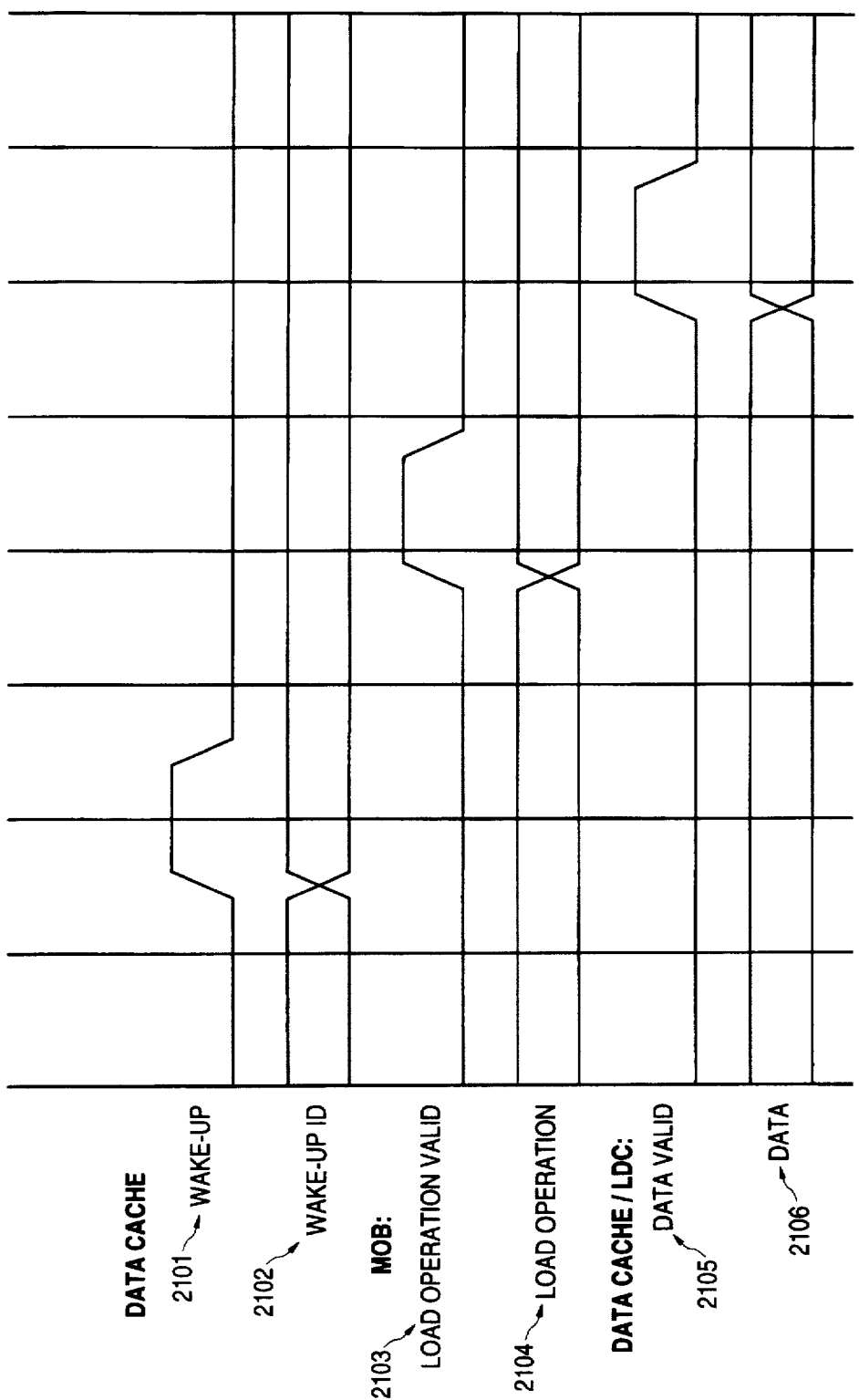
FIG. 16C is a timing diagram of the load wake-up and speculation dispatch according to the present invention.

FIG. 16C is a timing diagram illustrating the load wake-up and speculative dispatch according to the present invention. The load buffer in the MOB receives a wake-up signal and re-dispatches an operation speculatively. In this case, the data cache memory has sent a DCU squash wake-up signal with the ID of the queue 603 that blocked the load. The data cache memory sends a buffer wake-up signal 2101 and a wake-up ID 2102 to the load buffer. The ID 2102 is latched at the end of the clock. During the second clock cycle, the load buffer performs an internal content addressable (CAM) match on the wake-up, thereby setting the ready bits for those entries blocked on the queue 603. These bits are sent to the scheduling carry chain to determine one entry to speculatively dispatch the next cycle. During the third clock cycle, the scheduled entry 2104 is read into the load buffer, it is latched, it arbitrates for the bus, and is driven by the MOB onto the bus with the address, opcode and the data in conjunction with a valid signal 2103. During the fourth cycle, the load executes normally, continuing into the fifth clock cycle. At the end of the fifth clock cycle, the data cache memory is returning the data 2106 to the reservation station and the ROB, strobed by the valid signal 2105.

PART V—RESERVATION STATION

Figure 17A:
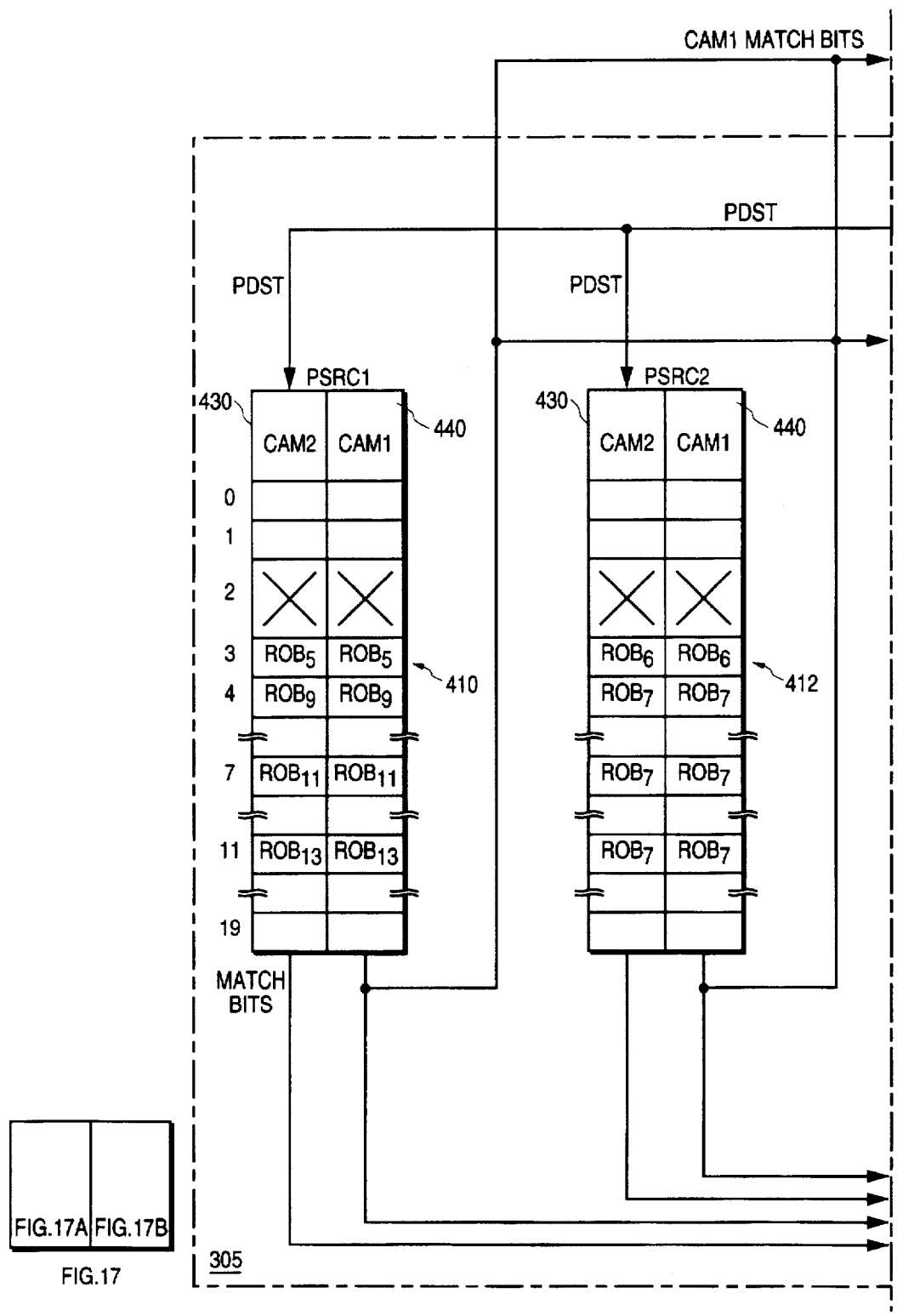
FIG. 17 is an illustration of the reservation station (RS) of the present invention.
Figure 17B:
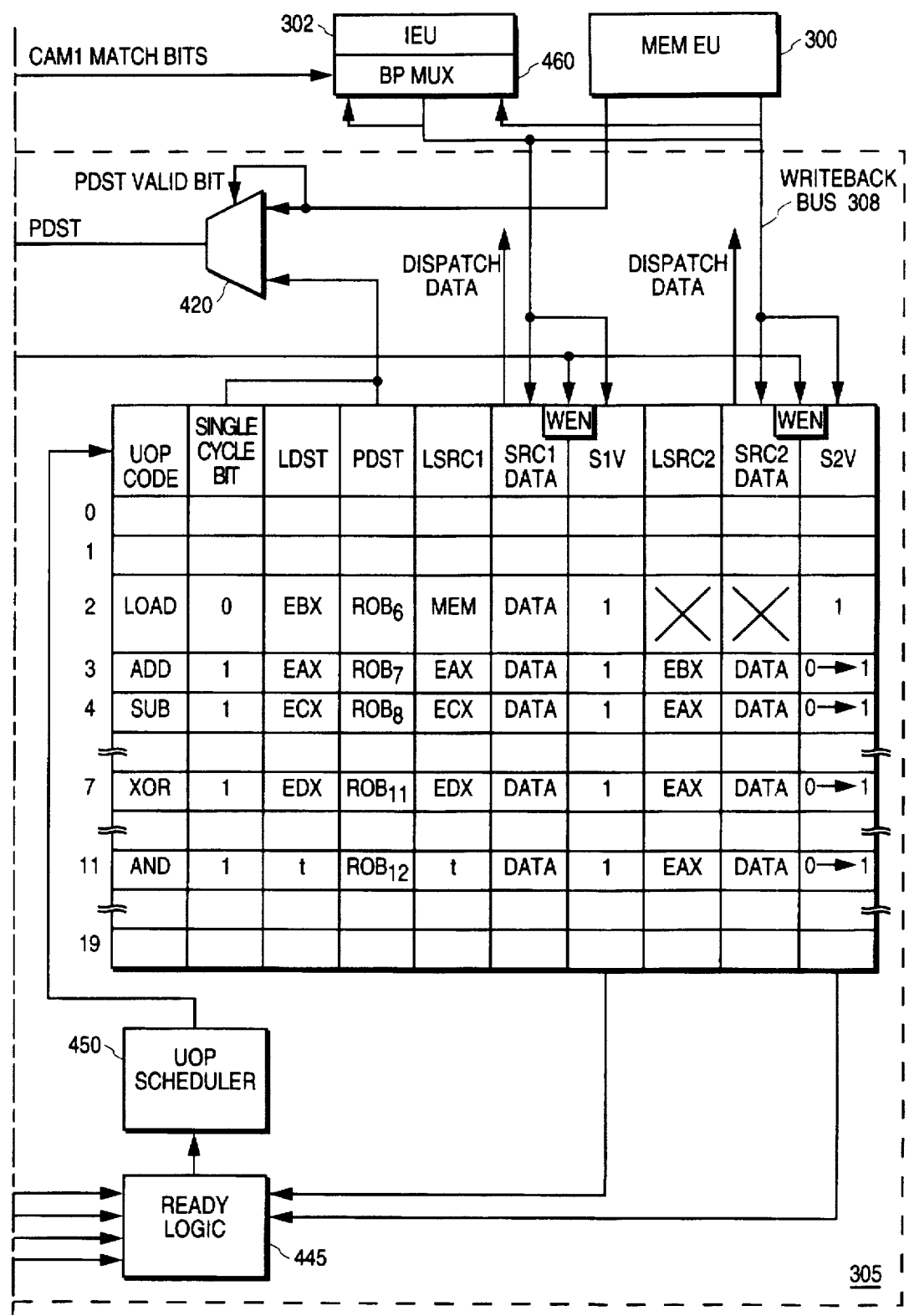

Refer to FIG. 17 which illustrates the reservation station 305 within the unit 203 of the processor 212 of the present invention. The reservation station (RS) serves as a temporary storage for instructions and their association information (e.g., source data) awaiting execution. The RS also determines source data and functional (execution) unit availability for the pending instructions. The RS schedules the resource-ready instruction for execution on a functional unit and dispatches (forwards the data and operation) the instructions to the scheduled functional unit. Also, in special cases of single cycle instructions (instructions consuming a single execution pipestage), the RS examines the data on the writeback bus (e.g., as generated by the functional units) against the source registers in the RS (e.g., CAM matching) in order to capture data needed by other pending instructions so that these pending instructions can be dispatched in an efficient manner. This involves data bypassing, as will be discussed further below. The above RS functions are illustrated below using example instructions.

For purposes of illustration, entries 2, 3, 4, 7 and 11 of the RS 305 buffer the micro operations (uops) of the following instruction sequence:

| macro op | uop |
| --- | --- |
| LOAD (ebx,mem) | ebx ← load (mem) |
| ADD (eax,ebx) | eax ← add(eax,ebx) |
| SUB (ecx,eax) | ecx ← sub(ecx,eax) |
| XOR (edx,eax) | edx ← xor(edx,eax) |
| AND (t,eax) | t ← and(t,eax) |

This instruction sequence is fetched from an instruction cache 202 (FIG. 4B) by the instruction fetch and issue unit 201 according to predicted instruction pointers from a branch target buffer (BTB). As an example, the ADD macro instruction is decoded by the instruction decoder of unit 201 into the micro operation eax←add(eax,ebx) in the Intel microprocessor architecture.

Figure 18:
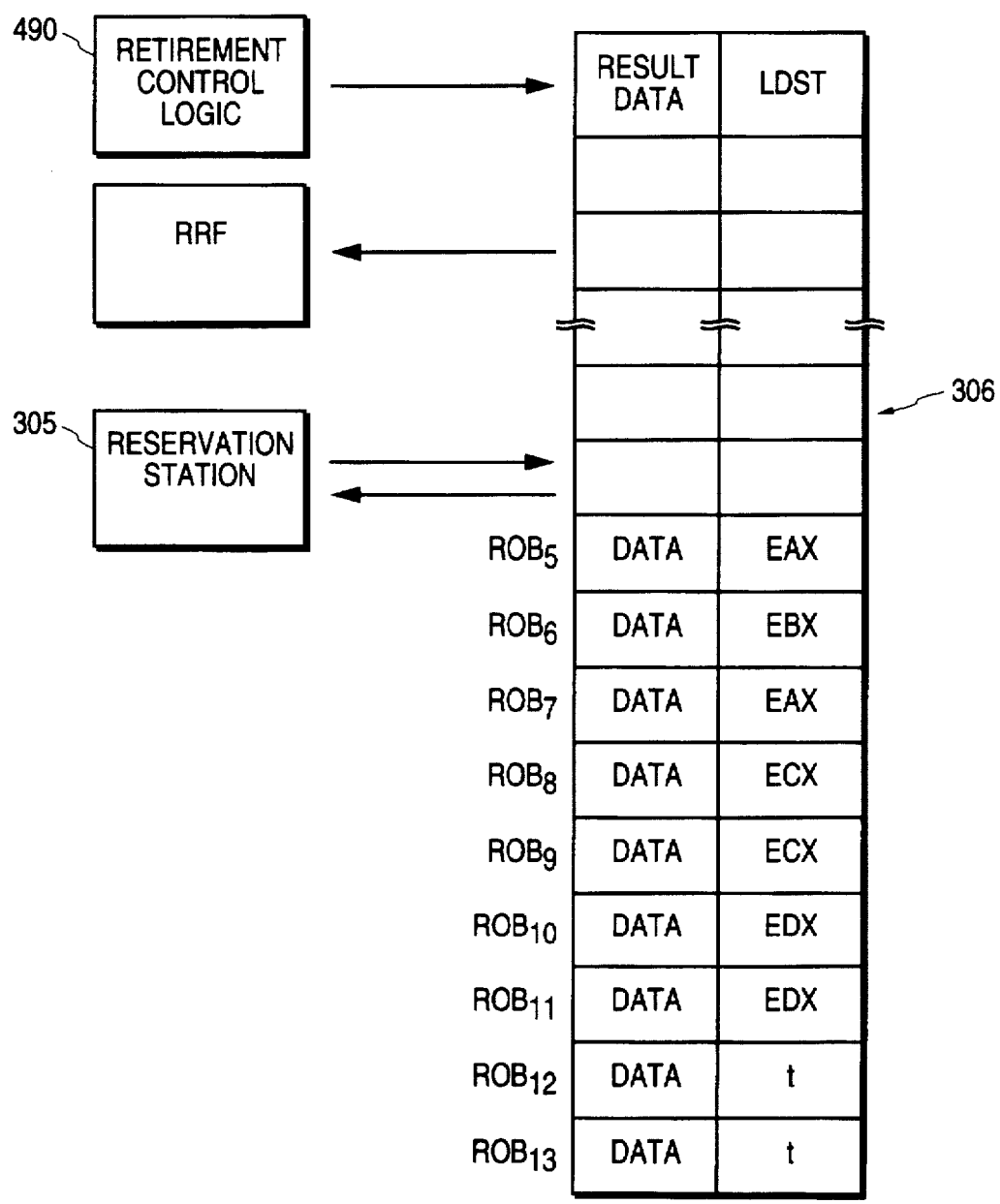
FIG. 18 illustrate a table in the reorder buffer of the present invention.

FIG. 18 illustrates a table in the ROB 306 showing the mapping of the logical registers specified by the instruction sequence to physical registers (Pdsts) in the ROB. It is appreciated herein that "Pdst" often refers to the register itself or the register designation (e.g., address) depending on the context in which the term is utilized. The ROB contains speculative, architecturally invisible instruction information. In this example, the first logical source eax register (LSRC1 in FIG. 17) of the ADD instruction, which must contain the result of a prior instruction, is mapped by the RAT 214 to the physical destination address (Pdst) of that prior instruction at ROB entry Pdst=ROB$_5$. Because the logical source register address (LSRC1) of the ADD instruction is the same as the logical destination address (LDST) of the prior instruction, LSRC1 is mapped to a first physical source register address (PSRC1) at the same ROB entry Pdst=ROB$_5$. Similarly, the second logical source register ebx (LSRC2), which also must contain the result of a prior instruction, is mapped to a second physical source register (PSRC2) at ROB entry Pdst=ROB$_6$. The logical destination register address (LDST) of the ADD instruction, also designated by the logical register address eax, is mapped to a physical destination register address (Pdst) at ROB entry Pdst=ROB$_7$. Similarly, the other instructions have their logical sources and destinations mapped to physical register identifiers in the ROB 306 by the RAT 214, and their corresponding uops are written into the entries of the reservation station 305. For reasons described below, the physical source register addresses PSRC1 and PSRC2 are stored as tags in content addressable memory (CAM) matching circuitry 410 and 412 (FIG. 17) for the first and second source operands, respectively. Any number of well known methods and circuits for performing CAM matching of an array of CAM cells against a data input may be used for 410 and 412 consistent within the scope of the present invention.

Note that the ADD instruction depends upon the result of the load instruction in that the second source operand of the ADD instruction is stored in the same logical register (ebx) as the result of the load instruction. Similarly, the subtract, exclusive OR (XOR) and AND instructions are dependent upon the ADD instruction in that the ADD instruction writes its results to the eax register, which is the second source operand of those three dependent instructions. For purposes of this example, the ecx, edx and t (temporary) source operand registers are assumed to hold valid data as a result of the execution of previous operations. As shown in FIG. 18, the ROB 306 is coupled to supply information to the retirement register file (RRF) and is also coupled to receive information from a Retirement Control Logic unit 490 which informs the ROB which instruction have retired and should update the RRF. The RS 305 is coupled to the ROB to supply and receive information. The ROB With reference back to FIG. 17, the reservation station 305 is now discussed in more detail. The RS 305 contains an entry (row) for each instruction pending execution. Associated with the instruction code (uop code) is the logical destination register LDST (e.g., the register before renaming), and the two logical source registers LSRC1 and LSRC2 of the instruction (e.g., before renaming). Also, the ROB entry assigned to the LDST is associated as Pdst and also the location of the operand source data (when available) is associated as SRC1 and SRC2. The entries of the ROB assigned to the source registers are stored in 430 and 440 for CAM matching. As the source becomes available, it is placed into the SRC1 DATA or SRC2 DATA columns. When the source data becomes available (valid) the appropriate valid bits S1V or S2V are set. As shown, the RS 305 is coupled to an instruction scheduler 450 and a ready determination circuit 445. The functions of the bypass MUX 460 and MUX 420 will be described further below. Instruction information is written into the RS during the Issue stage of the processor. Entries are allocated to the RS during the allocation pipestage of the Issue stage. Entries are deallocation from the RS after Dispatch. The processor 212 of the present invention is superscalar therefore both the first and second operands may become available at the same time due to the simultaneous execution of multiple instructions providing both operands. To accommodate the superscalar case, each CAM of FIG. 17 may represent a multi-ported CAM that receives a Pdst from each micro instruction that will be writing back its result.

Figure 19:
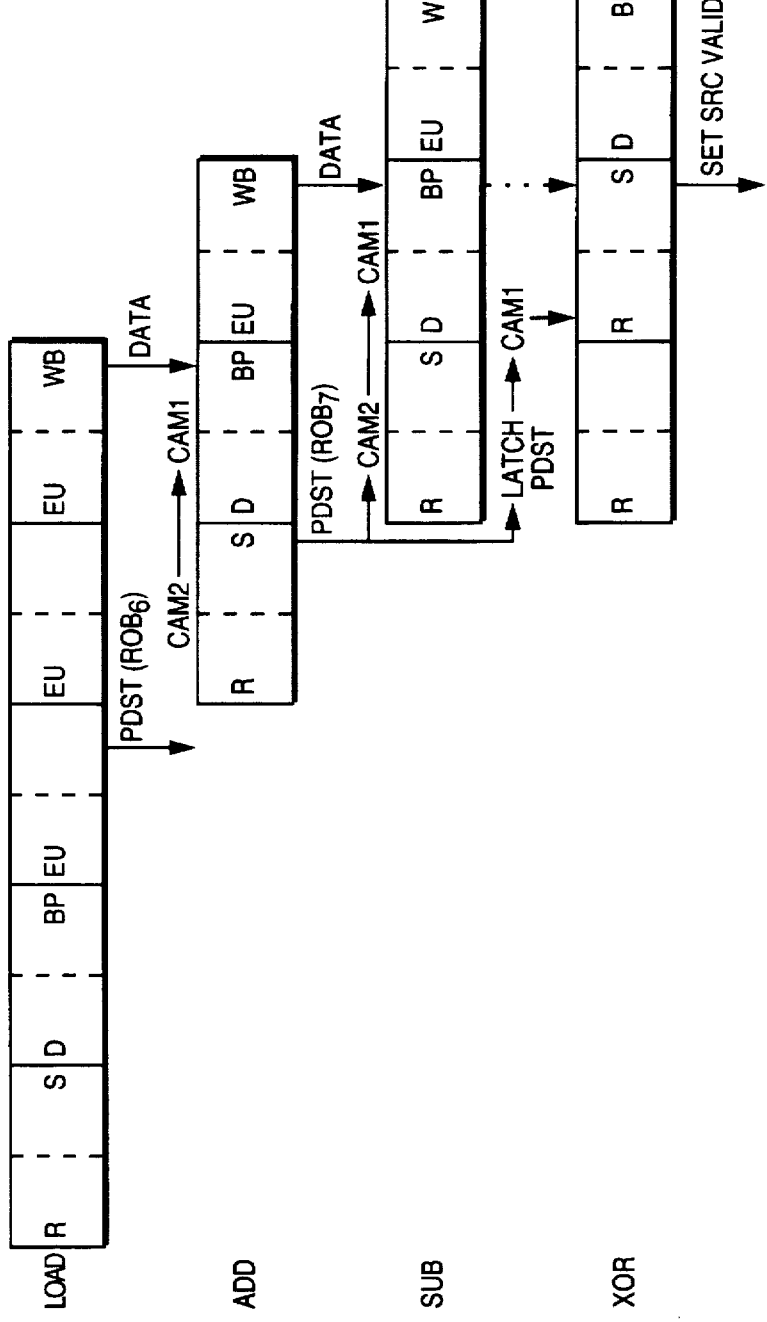
FIG. 19 illustrates pipeline stages implemented by the present invention for ready, schedule, and dispatch stages of the reservation station.

After the logical sources and destinations of a uop have been mapped to physical sources and destinations, and the uop is stored at an available entry in the RS 305 by the allocator 210, the micro instruction is scheduled for dispatch and executed according to the pipeline stages illustrated in FIG. 19A. The pipestages are divided according to processor clock cycles, with the solid vertical lines representing a rising clock edge and the dashed vertical lines representing a falling clock edge.

During the Ready pipestage, the RS 305 determines whether the source operands for a micro instruction are available and whether the execution unit for executing that micro instruction is also available. If ready, then the micro instruction enters the Schedule pipestage in which the RS determines whether multiple uops need to be dispatched for execution by the same execution unit, and, if so, arbitrates among such uops to determine the order in which they are to be scheduled for dispatch. During the Dispatch pipestage, the scheduled uop is read from its entry in the RS and delivered to the scheduled execution unit. As will be described in more detail below, after the dispatch of a uop, a Potential Bypass pipestage is made available in which result data needed by the uop may be bypassed directly from the execution unit executing a previous instruction to the execution unit executing the current uop. This avoids the necessity of writing the result data to the RS 305 or the ROB 306 and then reading the data out as a source operand of the currently executing uop, thus increasing instruction throughput.

During the Execution and Writeback stages, a uop is executed by the scheduled functional unit, and the result data written back from the execution unit into its corresponding ROB entry and into entries of the RS 305 that hold uops requiring the result data as a source operand. In addition, as mentioned above, the result data may be bypassed directly to an execution unit requiring the result data. It should be understood that the reservation station pipeline stages that are illustrated in FIG. 19A are but one means of processing an instruction according to the present invention and the present invention is applicable to any pipelined microprocessor.

As illustrated in FIG. 19B, the present invention enables the pipeline stages of micro instructions to be overlapped "back-to-back" in such a way as to achieve maximum execution throughput of the instructions. Such back-to-back scheduling results in a one cycle throughput for some instructions. In this example, FIG. 19B illustrates the back-to-back pipelining of the micro instructions of the exemplary micro instruction sequence described above. The load instruction passes through the Ready and Schedule stages, and then is dispatched to the memory execution unit 300. The execution of a load instruction takes three clock cycles. After execution, the result data, which is to be stored at the logical source register ebx and the corresponding physical destination register $ROB_6$, is placed on a write back bus 308 so that it may be written into the appropriate Pdst entry of the ROB. The result of the load instruction also provides a source operand for the subsequent add micro instruction.

Refer to FIG. 17 and FIG. 19B. The memory execution unit 300 provides the Pdst of the result two cycles before writing back the result data. This feature is used to allow the dependent ADD instruction to be scheduled for dispatch early enough to allow for the bypassing of the result data. With respect to scheduling, the Pdst from the memory execution unit 300 is fed through Pdst multiplexer 420 (FIG. 17) into two-cycle CAM matching circuitry 430 (CAM2), which stores the first and second physical source operand tags PSRC1 and PSRC2. The incoming Pdst is associatively matched with these source operand tags in the CAM2 arrays. In this example, the Pdst $ROB_6$ results in a match at entry 3 of the second source operand PSRC2 CAM2 array, indicating that the second source operand of the ADD instruction will soon become available on the writeback bus 308 from an execution unit. The resulting CAM match bit for entry 3 of the second source operand CAM2 array is fed into a ready logic circuit 445. As mentioned above, in this example the first source operand (corresponding to eax and located at $ROB_5$) of the ADD instruction is assumed to be available. In this example, we assume that the availability of the first source operand is indicated by setting a source valid bit (S1V) for the first source operand of the ADD instruction in the reservation station 305. This source valid bit is also fed into the ready logic circuit 445. Using this information, the ready logic circuit 445 determines that a source operand is available for dispatch to the appropriate execution unit along with the corresponding instruction when the following logical equation is satisfied:

Source Ready=[(source valid bit) OR (CAM2 match bit) OR (CAM1 match bit)]

An entire instruction is ready for dispatch when this equation is true for all source operands and an execution unit capable of executing the instruction (a)s specified by the opcode) is available. (The CAM1 match bit will be described below.) A scheduler circuit 450 maintains information regarding which execution units are available. In this example, both the first source valid bit and the second source CAM2 match bit have been set. Consequently, the ready logic circuit 445 determines that the add micro instruction entry will soon have both of its source operands available so that the instruction may be dispatched if the integer execution unit 302 is also available. The ready logic circuit 445 signals the scheduler circuit 450 that entry 3 is ready. In response to this signal, the scheduler circuit 450 will schedule the ADD instruction for dispatch to the integer execution unit 302. After an instruction is dispatched by the RS, its entry becomes invalid (deallocated from the RS).

During the writing of the Pdst by the memory execution unit 300, the Pdst is latched in the CAM circuitry (latch not shown) and used by 1-cycle CAM matching circuitry (CAM1) 440 during the Potential Bypass stage. The latched Pdst is associatively matched with the first and second source operand tags (PSRC1 and PSRC2) that are stored in the CAM1 440 arrays. The CAM1 match again results in a match for the second source operand (PSRC2) of entry 3.

Note that the Potential Bypass (BP) stage of the add micro instruction is timed to coincide with the writing back of data from the load micro instruction. The match bit resulting from the second source CAM1 match is used to control an EU bypass multiplexer 460 in the integer execution unit 302. In response to the CAM1 440 match bit, the EU bypass multiplexer 460 routes the result data directly from the memory execution unit 300 to a source operand input of the integer execution unit 302. Thus, upon receiving the dispatched add micro instruction, the integer execution unit 302 has all its source operands immediately available. As shown in FIG. 17, the CAM1 440 match bits are also fed into write enable inputs of the RS 305 to enable the write back of result data to the appropriate source data fields in the reservation station entries for which the Pdst of the write back data resulted in a match. The match bit also write enables the source data valid bit entries (S1V or S2V) to receive a writeback valid bit. For a number of operations, an execution unit writes the writeback data valid bit at the same time that it writes result data into the corresponding source data field. For example, an execution unit performing a load operation would write back a data valid bit with the data, and not at the earlier time of the CAM match, in order to ensure that data is not prematurely deemed valid before any potential cache misses are resolved. On the other hand, when the result of an instruction, such as an ADD, is inherently certain to be valid, then the valid bit may be preset to valid. Therefore, the valid bit would be set as soon as the corresponding entry is write enabled by the CAM1 440 match bit.

The foregoing discussion illustrates how the ADD micro instruction is made ready for dispatch and thereafter dispatched with all its source operands valid. The readiness determination of the operations dependent upon the ADD instruction will now be discussed. As mentioned above, the execution unit executing a dispatched instruction provides the Pdst two cycles before writing back the result data. The Pdst is then used to determine the readiness of instructions that depend upon the data to be written back. Here, the ADD instruction is a single cycle uop, i.e., the execution/write back stage occurs in a single processor cycle. The ADD is writing back data with a Pdst=$ROB_7$, which represents the logical destination register eax. The RS 305 allows back-to-back scheduling of single cycle uops, such as the ADD instruction, and their dependent instructions. This requires that at least one dependent instruction implement its ready pipestage at the same time that the ADD instruction is being dispatched.

In the case when the instruction writing back the data is a single cycle uop the RS provides an alternative scheduling procedure. Given our discussion above, the Pdst ($ROB_7$) for the ADD instruction is returned two cycles before the write back. But in this case for the ADD instruction (as shown in FIG. 19B), two cycles before write back occurs before the ADD instruction is even dispatched. It is impossible for the execution unit 302 to write back the Pdst for the ADD instruction before the ADD instruction is even dispatched. This is the case because it is the act of dispatch that informs the execution unit of the Pdst ($ROB_7$) in the first place. Therefore, the present invention utilizes an alternate way to provide the Pdst to the CAM2 and CAM1 matching logic. This alternate way is to read the Pdst for the ADD instruction directly from the RS 305 before the ADD instruction is dispatched. This is called the early read operation. It is appreciated that once the ADD instruction is dispatched by the RS, its entry information becomes deallocated (e.g., invalid) within the RS 305.

The present invention provides a mechanism for the early reading of the Pdst of a dispatching single cycle instruction (the early read operation) so that the Pdst may be read upon the assertion of a schedule line associated with the dispatching instruction and supplied before the instruction is actually dispatched. The early read operation utilizes non-clocked memory (static read memory) in order to supply the Pdst data of the RS before the clock edge while the read operation of other data from the RS is clocked. The Pdst is written into the RS 305 during allocation of the uop to the RS 305. Thus, in this example, after the ADD instruction has been determined to be ready, it is already known that the Pdst in the ADD reservation station entry represents the Pdst of data that will be written back after execution of the ADD instruction. Accordingly, the present invention provides the Pdst bypass multiplexer 420 with the Pdst from the ADD uop reservation station entry, and from the multiplexer 420 this Pdst is supplied directly to the CAM2 430 match circuitry of the first and second source operands, thereby bypassing the round trip of the Pdst from the third reservation station entry to the IEU 302 and back again. From the CAM2 430 circuitry, the Pdst is latched into the CAM1 circuitry 440. It is important to realize that the Pdst for the ADD is supplied in advance of the dispatch cycle of the ADD instruction.

Therefore, the multiplexer 420 provides the Pdst directly from the RS 305, and not from an execution unit, when a single cycle uop is to be dispatched. The multiplexing function of the multiplexer 420 may be controlled through a number of methods. First, only those execution units that execute multiple cycle uops are configured to transfer a Pdst Valid bit (PDSTV) along with the Pdst two cycles before write back. As shown in FIG. 17, the PDSTV bit acts as the input selector control of the Pdst bypass multiplexer 420. If the PDSTV bit is set (representing a multicycle uop), then the Pdst issued by the execution unit is routed to the CAM2 430 circuitry. The PDSTV bit is transferred along with the Pdst itself to the CAM2 430 in order to enable and initiate the CAM matching process. If the PDSTV bit is not set (representing a single cycle uop), then the Pdst from the add uop instruction entry of the RS 305 is routed by the multiplexer 420 to the CAM2 430 circuitry, thus bypassing the round-trip of the Pdst through an execution unit. The multiplexer 420 also routes a "single cycle bit" from the RS 305. The single cycle bit, like the PDSTV bit, is used to enable and initiate CAM matching. The single cycle bit is provided as part of the uop opcode during the process of decoding a macro instruction into single cycle uops. An alternative method (not shown) of controlling the Pdst bypass multiplexer 420 uses the single cycle bit alone as the multiplexer input selector control.

In this example, the bypassed Pdst of the ADD instruction is fed into the CAM2 430 circuitry to identify dependent instructions. The CAM2 match of the Pdst=ROB$_7$ results in matches for the second source operand of entries 4, 7 and 11. The match bit at those entries for the second source operand, along with the already set source 1 valid (S1V) bits for those entries indicates that the subtract, XOR and AND operations are ready for dispatch as soon as execution units are available to execute those functions.

Ideally, if different execution units were provided for each operation, all three dependent operations could be dispatched simultaneously. However, in an alternative embodiment, the subtract function and the logical XOR and AND functions may only be executed by the same execution unit, i.e., the integer execution unit 302. Thus, all three operations cannot be dispatched to the IEU 302 at the same time, but rather must be scheduled for dispatch one after the other. The scheduler 450 selects the order of dispatch according to a number of algorithms. The three dependent instructions may, for example, be scheduled randomly, sequentially, or in a first-in-first-out (FIFO) order, or some variation thereof. In this example, the scheduler 450 selects the micro operations to be dispatched in first-in-first-out order as shown in FIG. 19B. Because the subtract function is followed by the exclusive OR and logical AND functions, respectively, in the in-order program code, those instructions were issued to the reservation station in that order (from oldest to youngest). Thus, based on the FIFO algorithm scheduling, the subtract uop is dispatched first.

As before, the Pdst has been latched, and is used by the CAM1 circuitry 440 to control the EU bypass multiplexer 460 of the IEU 302 and the write enables of the RS source data entries. The match bit from the second source operand CAM1 440 implements an internal bypass of the result data from the execution of the ADD instruction in the IEU 302 back to the same IEU 302 for use as the second source operand for execution of the SUBTRACT instruction in the IEU 302. In this case, because the Pdst of the ADD instruction also resulted in CAM1 matches for entries 7 and 11, the result data from the ADD instruction is written into the second source data fields (SRC2 DATA) of the exclusive OR and logical AND operations, the write enables for those fields having been asserted by the match bit from second source operand CAM1 440.

However, the CAM1 match performed during dispatch of the subtract operation can be used to determine again the readiness of instructions for dispatch. This obviates the need to provide storage for the previously determined ready state. The CAM1 match determines that the XOR and AND operations are ready. However, the CAM1 match bit for the SUBTRACT instruction is not used to determine again the readiness of that instruction because that would result in multiple dispatches of the SUBTRACT instruction. Thus, although the subtract operation uses the CAM1 match bit for controlling the EU bypass multiplexer 460 and the write enables of the RS 305 entries, the ready logic for the entry containing the subtract operation is disabled by the scheduler 450 after scheduling that instruction for dispatch. This operation is performed by resetting an entry valid bit (not shown) in the RS 305, which is fed to the ready logic 445 for each entry. In general, the ready logic for any instruction entry is disabled after it has been scheduled to prevent multiple dispatches of the same instruction.

After the XOR and AND operations have been found ready, the scheduler 450 arbitrates between the two instructions and selects the XOR entry for dispatch according to the FIFO algorithm used in this example. The XOR entry is then dispatched. Because the result data Writeback stage of the add uop coincides with the Schedule stage of the XOR uop, the result data is already stored in the XOR SRC2 DATA by the entry at the time the XOR uop is dispatched, thereby providing the source operand data to the IEU 302. Because the previous result data is available from the RS entry, the EU bypass multiplexer 460 is disabled by the RS after the result data has been written into the RS in order to prevent bypassing.

During the write back of the result data after execution of the ADD micro instruction, along with the result data that is written into entries of the reservation station 305, corresponding source valid bits are set in those entries using the writeback data valid bit described above. During writeback, the data from the IEU 302 is also written into the ROB 306 via the writeback bus 308. All subsequent instructions, e.g., the logical AND micro operation, then use the source valid bits, which are fed into the ready logic 445, to determine whether a source operand is ready for dispatch.

As discussed above, the circuitry to perform the early read operation is not clock based but is triggered based on the assertion of the schedule line of the ADD instruction for the particular execution unit selected for the ADD instruction. Therefore, the read of the RS array for the ADD's Pdst begins within the schedule stage of the ADD pipeline. If this read operation were dynamic (e.g., clocked) then the result of the read operation would not be supplied until the next rising edge of the clock, which would be at the start of the dispatch stage of the ADD instruction (which is also the same time as the start of the ready determination stage of the SUB instruction). But this read of the ADD's Pdst would be much too late for the ready determination stage of the SUB instruction because the SUB instruction needs the Pdst information before the start of its ready determination stage.

A source valid bit may be set using a number of methods, including use of the writeback data valid bit as described above. Three other mechanisms will be described for setting the valid bit when source data becomes available before a dependent instruction is written to the reservation station. First, if the available operand is an immediate value, e.g., the second value in add (eax, 1), then the RAT 214 causes the RS 305 to set the S2V bit upon issue of the instruction to the RS 305. Second, if the source operand is the result of an operation that has already been executed and retired, then the corresponding entry in the RAT 214 will have its RRFV bit set. This bit is also passed to the RS 305, and will cause the RS 305 to set the source valid bit. Third, if the source operand is the result of an operation that has already been executed but has not yet retired, then the RAT 214 will send the PSRC of the source operand to the ROB, which reads the result and passes it to the RS, again setting the source valid bit.

PART VI—REORDER BUFFER

The reorder buffer (ROB) 306 is a fundamental component in three aspects of the processor of the present invention: speculative execution, register renaming, and out-of-order execution. The ROB 306 provides the extra storage for physical registers that permits register renaming which permit more parallelism in executing instructions. The ROB 306 stores instructions that are speculatively executed to provide a storage buffer prior to committing the results to the architectural state of the processor. The ROB 306 provides a storage buffer to permit reordering of the machine state, in the original program order, from out-of-order operations. The ROB 306 detects exceptions and mispredictions, thereby subsequently initiating repair to retain the proper machine state.

The ROB 306 supports speculative execution by buffering the results from the execution units before committing architecturally visible state of the writeback data in the RRF. Consequently, instructions are fetched and executed at a maximum rate by assuming branches are properly predicted and no exceptions occur. If a branch is mispredicted, or if an exception occurs in executing a instruction, the processor can recover simply by discarding the speculative result stored in the ROB 306. In this case, the processor restarts processing at the proper instruction by examining the committed architectural state in the RRF. A key function of the ROB 306 is retirement or completion of instructions. The process of committing speculative state to architectural state is termed retirement. The ROB 306 supports out-of-order execution by allowing execution units to complete instruction execution and writeback data results without regard to other instructions that are executing simultaneously. Therefore, as far as the execution units are concerned, instructions complete out-of-order. The retirement control logic in the ROB 306 subsequently reorders the completed instructions into the original sequence issued by the ID 201 as it updates the architectural state in the RRF.

The buffer storage for executed results is also used to support register renaming. Register renaming allocates a new physical register as the destination of every operation which writes to an architectural register. The renaming process is hardware managed and is invisible externally. The execution units write result data only into the renamed register in the ROB. The retirement logic in the ROB updates the architectural registers (RRF) based upon the contents of each renamed instance of the architectural registers. Instructions which source an architectural register obtain either the contents of the actual architectural register or the contents of the renamed register. Since processor 212 is superscalar, different operations in a clock which use the same architectural register may in fact access different physical registers.

Figure 20:
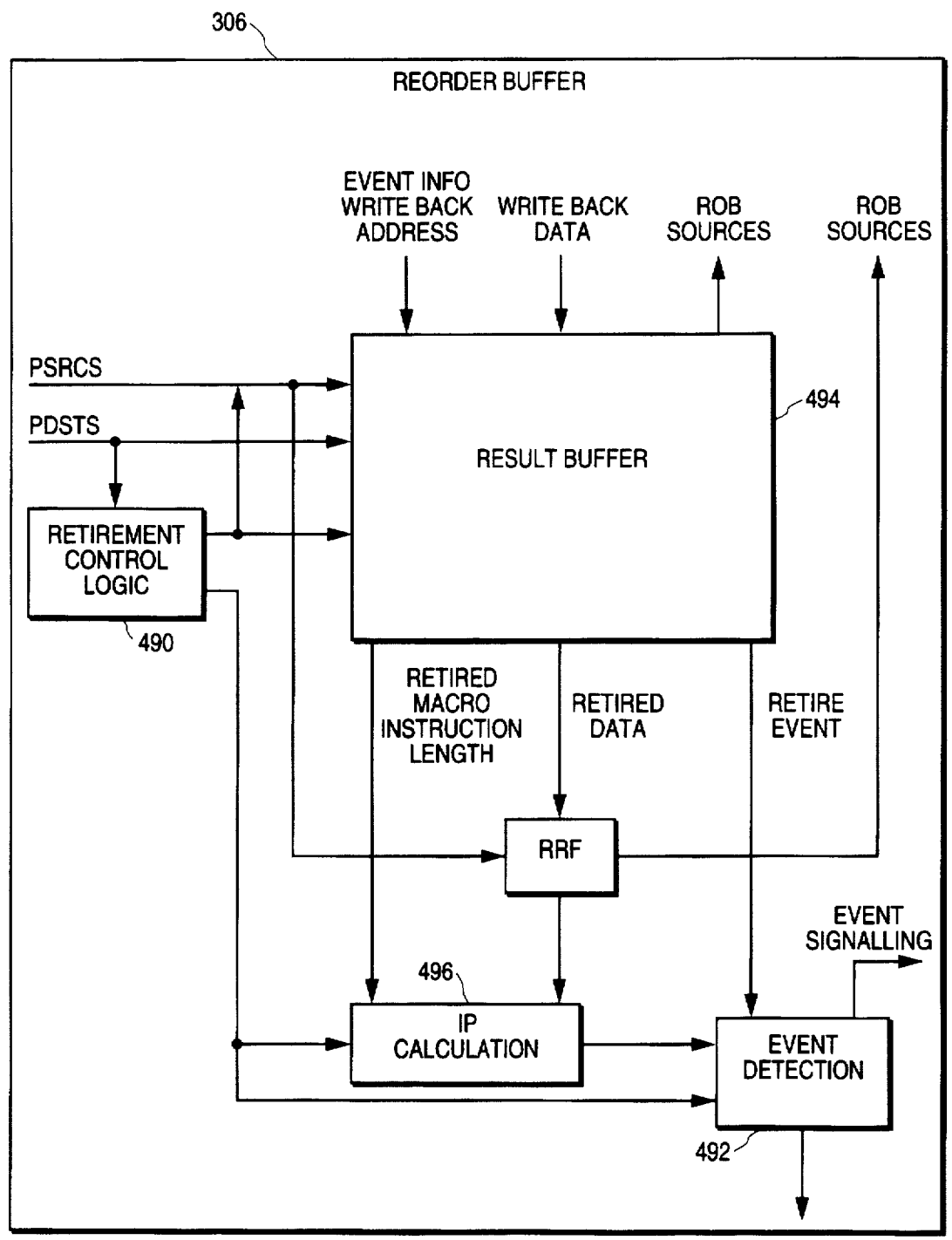
FIG. 20 illustrates the reorder buffer (ROB) of the present invention.

FIG. 20 illustrates a block diagram of the ROB 306 configured in accordance with one embodiment of the present invention. As shown in FIG. 20, in addition to the RRF, the ROB 306 contains four internal functional blocks: result buffer, retirement control logic 494, IP calculation 496, and event detection 492. In one embodiment, the buffer storage 494 contains 40 entries. The retirement control logic 490 generates addresses for retirement reads performed in each clock cycle. In general, the retirement control logic 490 computes retirement valid signals indicating which entries with valid writeback data are ready for retirement. The IP calculation 496 generates the architectural instruction pointer as well as several other macro and microinstruction pointers. The instruction pointer is generated based on the lengths of all the instructions that retire, as well as any branch target addresses. Each entry stored in the ROB 306 contains control information, a validity bit, data, that indicates whether or not the instruction result is valid, and corresponding the logical destination (Ldst). Each entry in the ROB 306 also contains fields for a instruction result (Pdst), a set of flags, a mask for the flags, a code that indicates what the results mean, and fault data.

The event detection 492 determines whether the execution unit, processing the corresponding instruction, reported an event. If an event is reported, the ROB 306 entries following the entry reporting the event are discarded. In addition, processor circuitry is signaled to jump to a particular microcode handler, and most of the state of the entry with an event is saved for micro-code handling use. The signaling of an event is based on the events reported to the ROB 306 by the execution units in the execution cluster 203. The event detection block 492 saves all states from the corresponding ROB entry needed by the micro-code event handler. The event detection 492 also generates several events in addition to the events reported by the execution cluster 203. For example, when the ROB 306 determines that a wrong path is taken based on a prediction of a branch instruction, any operations in the wrong path are not allowed to retire. In this case, the event detection 492 causes flushing of the speculative state from the processor, and a micro-code jump to an event handler. Also, when the ROB 306 retires an operation that faults, the in order and out-of-order circuitry of the processor is cleared.

The ROB 306 is active in both the in-order and out-of-order portions of the processor. During the allocation pipestage, entries in the ROB 306 that hold the result of the speculative instructions are allocated. In addition, addresses of the ROB entries (Pdsts) for the instructions are also written to the RS 305. In the pipestage immediately following entry allocation in the ROB 306, the source data corresponding to the instructions are read from the ROB. The source addresses are provided by the RAT 214 based on the alias table update. The RAT writes the addresses of the ROB entries sourced with each instruction into the RS.

After execution, the execution unit performs the appropriate function, and the corresponding execution unit writes back destination data into the ROB during Writeback. The writeback pipestage is decoupled from the register rename and register read pipestages because the instructions are issued out-of-order from the RS 305. During the Retirement pipestage, the retirement control logic 490 reads candidates for retirement. Instructions ready for retirement are calculated and the event detection 492 detects any events, and the IP calculation 496 calculates the current instruction pointer. The retirement pipestages are decoupled from writeback pipestages, because the writebacks are out-of-order with respect to the original program. During retirement, the architectural state is updated by transferring retired ROB entries to the RRF.

Thus, the present invention, a method an apparatus for dynamically allocating resources of a reservation station, a reorder buffer, a store buffer and a load buffer for processing instructions has been described. Whereas many alterations and modifications of the present invention will become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which recite the essential features.

We claim:

1. A pipelined processor comprising:
   a reorder buffer containing result information generated by speculative instructions;
   a reservation station coupled to said reorder buffer, said reservation station containing information associated with instructions pending execution; and
   an allocator coupled to said reorder buffer and said reservation station, said allocator allocating entries of said reorder buffer and said reservation station during an allocation pipestage of said pipelined processor, said allocation pipestage following a decode pipestage of said pipelined processor and preceding a dispatch pipestage of said pipelined processor, said allocator locating entries of said reservation station for each pending instruction except for one or more register exchange instructions.

2. The processor of claim 1 further comprising:
   a load buffer containing information associated with load instructions;
   a store buffer containing information associated with store instructions; and
   wherein said allocator allocates entries of said load buffer to said load instructions during said allocation pipestage and allocates entries of said store buffer to said store instructions during said allocation pipestage.

3. The processor of claim 2 wherein said allocator comprises:
   sequential allocation means for sequentially allocating entries of said reorder buffer, said load buffer and said store buffer; and
   nonsequential allocation means for nonsequentially allocating entries of said reservation station.

4. The processor of claim 3 wherein said reorder buffer, said load buffer and said store buffer each comprise a circular buffer having a tail pointer indicating a last valid entry and a head pointer indicating a first valid entry.

5. The processor of claim 2 wherein said reorder buffer includes a plurality of physical registers for containing said result information and said reorder buffer expands a register set associated with said processor.

6. The processor of claim 2 wherein said allocator comprises instruction allocation means for allocating a full set of instructions to said reorder buffer, a subset of instructions to said reservation station, load instructions to said load buffer and store instructions to said store buffer.

7. The processor of claim 2 further comprising means for stalling said processor from issuing instructions provided entries are unavailable within said reorder buffer, said reservation station, or said load buffer.

8. The processor of claim 2 further comprising a bus coupled to said processor and wherein said store instructions are executed when committed to memory over said bus.

9. A computer system comprising:
   a bus for communicating information;
   a memory storage unit coupled to said bus for storing information;
   a first processor coupled to said bus; and
   a second processor coupled to the bus, the second processor being a pipelined processor comprising:
      a reorder buffer containing result information generated by speculative instructions;
      a reservation station coupled to said reorder buffer, said reservation station containing information associated with instructions pending execution; and
      an allocator coupled to said reorder buffer and said reservation station, said allocator allocating entries of said reorder buffer and said reservation station during an allocation pipestage of said pipelined processor, said allocation pipestage following a decode pipestage of said pipelined processor and preceding a dispatch pipestage of said pipelined processor, said allocator allocating entries of said reservation station for each pending instruction except for one or more register exchange instructions.

10. The computer system of claim 9 wherein the second processor further comprises a store buffer for containing information associated with store instructions, wherein entries of said store buffer are allocated during said allocation pipestage and remain allocated until said store instructions are executed.

11. The computer system of claim 10 wherein said allocator allocates entries of said store buffer.

12. The computer system of claim 11 wherein said allocator comprises:
   sequential allocation logic to sequentially allocate vacant entries of said store buffer to instructions provided by said issue unit; and
   nonsequential allocation logic to nonsequentially allocate entries of said reservation station to instructions provided by said issue unit.

13. The computer system of claim 10 further comprising:
   a load buffer comprising a plurality of entries for containing information associated with load instructions, wherein entries of said load buffer are allocated during said allocation pipestage and remain allocated until said retirement pipestage; and
   wherein said reorder buffer, said load buffer and said store buffer each comprise circular buffers having a tail pointer indicating a last valid entry and a head pointer indicating a first entry.

14. The computer system of claim 9 wherein said reorder buffer comprises a plurality of physical registers for containing said operand information.

15. In a pipeline processor having a pipeline comprising allocation, dispatch and retirement pipestages, a method of dynamically allocating resources in said processor, said method comprising the steps of:

(a) allocating entries of a first buffer to instructions during said allocation pipestage and until said retirement pipestage for said instructions, wherein said first buffer contains information associated with speculative instructions;

(b) allocating entries of a reservation station to instructions during said allocation pipestage and until said dispatch pipestage, wherein said reservation station contains information associated with instructions pending execution; and wherein said step (b) of allocating entries of a reservation station is performed for each instruction processed by said processor except for one or more register exchange instructions.

16. The method of claim 15 further comprising the steps of:

(c) allocating entries of a load buffer to load instructions during said allocation pipestage and until said retirement pipestage;

(d) allocating entries of a store buffer to store instructions during said allocation pipestage and until said store instructions are performed over a bus coupled to said processor.

17. The method of claim 15 further comprising the steps of:

(c) allocating entries of a load buffer to load instructions during said allocation pipestage and until said retirement pipestage;

(d) allocating entries of a store buffer to store instructions during said allocation pipestage and until a time period subsequent to said retirement pipestage.

18. The method of claim 15 wherein step (a) is performed sequentially and step (b) is performed nonsequentially.

19. The method of claim 15 wherein step (a) is performed for each instruction processed by said processor.

20. The method of claim 19 wherein the one or more register exchange instructions include a floating point register exchange instruction.

21. The method of claim 15 further comprising the step of stalling said processor from issuing instructions if entries within said first buffer or said load buffer are unavailable.

22. The method of claim 16 further comprising the step of stalling said processor from issuing instructions if entries within said first buffer, reservation station, load buffer or said store buffer are unavailable.

* * * * *